US009346483B2

(12) United States Patent
Davis et al.

(10) Patent No.: US 9,346,483 B2
(45) Date of Patent: *May 24, 2016

(54) UTILITY CUTTER

(71) Applicant: ADCO Industries-Technologies, L.P., Dallas, TX (US)

(72) Inventors: Raymond E. Davis, Heath, TX (US); Clifton Glenn Hampton, Burleson, TX (US)

(73) Assignee: ADCO Industries-Technologies, L.P., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/336,841

(22) Filed: Jul. 21, 2014

(65) Prior Publication Data

US 2014/0352157 A1 Dec. 4, 2014

Related U.S. Application Data

(63) Continuation of application No. 13/765,371, filed on Feb. 12, 2013, now Pat. No. 8,782,909.

(51) Int. Cl.
*B26B 3/00* (2006.01)
*B62D 3/00* (2006.01)
(Continued)

(52) U.S. Cl.
CPC ... *B62D 3/00* (2013.01); *B26B 1/08* (2013.01); *B26B 3/08* (2013.01); *B26B 5/003* (2013.01);
(Continued)

(58) Field of Classification Search
CPC .......... B26B 1/08; B26B 5/001; B26B 5/005; B26B 5/006; B26B 29/02; B26B 5/003; B26B 3/08; B26B 3/00; Y10T 83/0605; Y10T 83/05; Y10T 83/0524

USPC ........... 83/39; 30/280, 294, 317, 314, 320, 2, 30/293, 162

See application file for complete search history.

(56) References Cited

U.S. PATENT DOCUMENTS 1,250,538 A 12/1917 Williams
2,018,149 A 10/1935 Randle
(Continued)

FOREIGN PATENT DOCUMENTS

DE 198704973 U1 8/1987
DE 4315495 A1 11/1994
(Continued)

OTHER PUBLICATIONS

Office Action mailed Feb. 7, 2011, in U.S. Appl. No. 11/735,997 (10 pages).

(Continued)

*Primary Examiner* — Omar Flores Sanchez
(74) *Attorney, Agent, or Firm* — Fish & Richardson P.C.

(57) ABSTRACT

A knife includes a handle that includes a gripping surface; a blade slide positioned in a recess of the handle that extends from an opening of the handle through a cavity within the handle; a blade coupled to the blade slide near a proximal end of the blade and extending through the recess and into the opening when the blade slide is in the retracted position; and a guide coupled to the blade near a distal end of the blade opposite the proximal end, the guide including a contoured surface configured to engage a workpiece to extend the blade slide a distance from the retracted position to an extended position such that the blade is extended from the opening of the handle, the blade slide biased to move from the extended position to the retracted position.

26 Claims, 18 Drawing Sheets

(51) Int. Cl.
  *B26B 3/08*   (2006.01)
  *B26B 1/08*   (2006.01)
  *B26B 5/00*   (2006.01)
  *B26B 29/02*  (2006.01)

(52) U.S. Cl.
  CPC .............. *B26B 5/005* (2013.01); *B26B 29/02* (2013.01); *Y10T 83/05* (2015.04); *Y10T 83/0524* (2015.04); *Y10T 83/0605* (2015.04)

(56) References Cited

U.S. PATENT DOCUMENTS

| | | | | |
|---|---|---|---|---|
| 2,253,099 | A * | 8/1941 | Shaffer | 30/156 |
| 2,616,172 | A | 11/1952 | Parker | |
| 3,439,419 | A | 4/1969 | Fleming | |
| 3,613,241 | A | 10/1971 | Allen | |
| 3,824,688 | A | 7/1974 | Goffe | |
| 3,991,467 | A | 11/1976 | Yokoyama | |
| 4,048,719 | A | 9/1977 | Thompson | |
| 4,134,206 | A | 1/1979 | Beermann | |
| 4,139,939 | A | 2/1979 | Crooks | |
| 4,180,908 | A | 1/1980 | Beermann | |
| 4,320,576 | A | 3/1982 | Beermann | |
| 4,419,794 | A | 12/1983 | Horton | |
| 4,531,286 | A | 7/1985 | Vito | |
| 4,683,656 | A | 8/1987 | Peyrot | |
| 4,713,885 | A | 12/1987 | Keklak | |
| 4,718,586 | A | 1/1988 | Hagino | |
| 4,757,612 | A | 7/1988 | Peyrot | |
| 4,769,912 | A | 9/1988 | Davis | |
| 4,805,304 | A | 2/1989 | Knoop | |
| 4,835,865 | A | 6/1989 | Knoop | |
| 4,837,931 | A | 6/1989 | Beermann | |
| 4,868,985 | A | 9/1989 | Rehm | |
| 4,899,443 | A | 2/1990 | Beermann | |
| 4,949,458 | A | 8/1990 | Davis | |
| 5,012,581 | A | 5/1991 | Fletcher | |
| 5,054,170 | A | 10/1991 | Otrusina | |
| 5,133,132 | A | 7/1992 | Yu | |
| 5,203,085 | A | 4/1993 | Berns | |
| 5,299,355 | A | 4/1994 | Boda | |
| 5,303,474 | A | 4/1994 | Keklak | |
| 5,337,482 | A | 8/1994 | Schmidt | |
| 5,384,963 | A | 1/1995 | Beermann | |
| 5,386,632 | A | 2/1995 | Schmidt | |
| 5,426,855 | A | 6/1995 | Keklak | |
| 5,481,804 | A | 1/1996 | Platts | |
| 5,511,311 | A | 4/1996 | Collins | |
| 5,598,634 | A | 2/1997 | Berns | |
| 5,613,300 | A | 3/1997 | Schmidt | |
| 5,617,635 | A | 4/1997 | Berns | |
| 5,620,120 | A | 4/1997 | Tien | |
| 5,647,132 | A | 7/1997 | Berns | |
| 5,730,342 | A | 3/1998 | Tien | |
| 5,735,051 | A | 4/1998 | Berns | |
| 5,737,842 | A | 4/1998 | Freedman | |
| 5,768,787 | A | 6/1998 | Ireland | |
| 5,839,173 | A | 11/1998 | Otrusina | |
| D401,832 | S | 12/1998 | Keklak | |
| 5,890,294 | A | 4/1999 | Keklak | |
| 5,924,203 | A | 7/1999 | Huang | |
| 6,000,136 | A | 12/1999 | Owens | |
| 6,000,590 | A | 12/1999 | Allen | |
| 6,070,326 | A | 6/2000 | Berns | |
| 6,105,838 | A | 8/2000 | Hansen | |
| 6,148,520 | A | 11/2000 | Berns | |
| 6,192,589 | B1 | 2/2001 | Martone | |
| 6,195,896 | B1 | 3/2001 | Ireland | |
| 6,205,667 | B1 | 3/2001 | Glesser | |
| 6,233,832 | B1 | 5/2001 | Berns | |
| 6,308,418 | B1 | 10/2001 | Sweet | |
| 6,314,646 | B1 | 11/2001 | Schmidt | |
| 6,364,182 | B1 | 4/2002 | Hansen | |
| 6,382,481 | B1 | 5/2002 | McIlmoil | |
| 6,427,374 | B1 | 8/2002 | Vaiani | |
| 6,453,559 | B1 | 9/2002 | Marshall | |
| 6,532,670 | B1 | 3/2003 | Berns | |
| 6,550,144 | B1 | 4/2003 | Berns | |
| 6,553,673 | B2 | 4/2003 | Peyrot | |
| 6,578,266 | B2 | 6/2003 | Chomiak | |
| 6,578,745 | B1 | 6/2003 | Taylor | |
| 6,591,501 | B1 | 7/2003 | Phillips | |
| 6,637,112 | B2 | 10/2003 | Davis | |
| 6,718,637 | B1 | 4/2004 | Ortner | |
| 6,742,261 | B2 | 6/2004 | Ho | |
| 6,752,299 | B2 | 6/2004 | Shetler | |
| 6,775,911 | B2 | 8/2004 | Tremblay | |
| 6,785,966 | B2 | 9/2004 | Berns | |
| 6,813,833 | B2 | 11/2004 | Saunders | |
| 6,817,499 | B2 | 11/2004 | Martinez | |
| 6,874,237 | B2 | 4/2005 | Robitaille | |
| 6,889,879 | B2 | 5/2005 | Rivera | |
| 6,898,856 | B2 | 5/2005 | Mak | |
| 6,907,668 | B2 | 6/2005 | Polei | |
| 6,938,343 | B2 | 9/2005 | Yamagishi | |
| 6,966,519 | B2 | 11/2005 | Salentine | |
| 7,028,406 | B2 | 4/2006 | Polei | |
| 7,032,791 | B2 | 4/2006 | Stotts | |
| D521,844 | S | 5/2006 | Kempker | |
| 7,082,688 | B2 | 8/2006 | Votolato | |
| D527,604 | S | 9/2006 | Kempker | |
| 7,540,092 | B2 | 6/2009 | Polei | |
| 7,596,868 | B2 | 10/2009 | Berns | |
| 7,596,869 | B2 | 10/2009 | Berns | |
| 7,647,702 | B2 | 1/2010 | Polei | |
| 7,870,675 | B1 | 1/2011 | Della | |
| 8,056,241 | B2 | 11/2011 | Davis | |
| 8,220,160 | B2 | 7/2012 | Davis | |
| 8,250,764 | B2 | 8/2012 | Davis | |
| 2002/0029482 | A1 | 3/2002 | Peyrot | |
| 2002/0124412 | A1 | 9/2002 | Votolato | |
| 2002/0124418 | A1 | 9/2002 | Votolato | |
| 2002/0162849 | A1 | 11/2002 | Chen | |
| 2003/0042348 | A1 | 3/2003 | Salentine | |
| 2003/0106917 | A1 | 6/2003 | Shetler | |
| 2003/0140746 | A1 | 7/2003 | Yamagishi | |
| 2003/0141329 | A1 | 7/2003 | Huang | |
| 2003/0154606 | A1 | 8/2003 | Saunders | |
| 2003/0213823 | A1 | 11/2003 | Papovitch | |
| 2004/0173650 | A1 | 9/2004 | Berns | |
| 2004/0187314 | A1 | 9/2004 | Johnson | |
| 2004/0237312 | A1 | 12/2004 | Hernandez | |
| 2005/0072819 | A1 | 4/2005 | Maldonado | |
| 2005/0217114 | A1 | 10/2005 | Votolato | |
| 2006/0130338 | A1 | 6/2006 | Dzubak | |
| 2006/0130339 | A1 | 6/2006 | Berns | |
| 2007/0101576 | A1 | 5/2007 | Green | |
| 2007/0130778 | A1 | 6/2007 | Ruggiero | |
| 2007/0186424 | A1 | 8/2007 | Becker | |
| 2007/0209209 | A1 | 9/2007 | Davis | |
| 2007/0240314 | A1 | 10/2007 | Ireland | |
| 2007/0245572 | A1 | 10/2007 | Ireland | |
| 2008/0086894 | A1 | 4/2008 | Sullivan | |
| 2008/0086895 | A1 | 4/2008 | Parks | |
| 2008/0222899 | A1* | 9/2008 | Durham | 30/291 |
| 2009/0094840 | A1 | 4/2009 | Kanemoto | |
| 2010/0088900 | A1 | 4/2010 | Davis | |
| 2010/0187276 | A1 | 7/2010 | Ohmura | |
| 2010/0319200 | A1 | 12/2010 | Davis | |
| 2013/0061478 | A1* | 3/2013 | Lutgen et al. | 30/160 |
| 2013/0067751 | A1 | 3/2013 | Davis | |

FOREIGN PATENT DOCUMENTS

| | | |
|---|---|---|
| DE | 19601015 A1 | 7/1997 |
| DE | 29709671 US | 5/1998 |
| DE | 20202978 U1 | 6/2002 |
| DE | 20210670 U1 | 10/2002 |
| DE | 60101654 T2 | 11/2004 |
| DE | 102005057213 B3 | 3/2007 |
| EP | 676993 B1 | 2/2000 |
| EP | 1273399 B1 | 1/2005 |
| EP | 1674219 B1 | 10/2007 |
| EP | 1946897 B1 | 9/2010 |

(56) References Cited

FOREIGN PATENT DOCUMENTS

| EP | 1982802 B1 | 6/2011 |
|---|---|---|
| FR | 2552008 A1 | 3/1985 |
| FR | 2810574 A1 | 12/2001 |
| GB | 642219 A | 8/1950 |
| GB | 649406 A | 1/1951 |
| GB | 2083775 A | 3/1982 |
| KR | 199003560 B1 | 5/1990 |
| KR | 199206556 B1 | 8/1992 |
| KR | 879807 B1 | 1/2009 |

OTHER PUBLICATIONS

Office Action mailed Jun. 21, 2013, in U.S. Appl. No. 13/765,371 (11 pages).
Final Office Action mailed Jul. 26, 2011, in U.S. Appl. No. 11/735,997 (10 pages).
Office Action mailed Oct. 13, 2011, in U.S. Appl. No. 11/735,997 (8 pages).
Office Action mailed May 23, 2012, in U.S. Appl. No. 11/735,997 (9 pages).
Office Action mailed Apr. 19, 2013, in U.S. Appl. No. 13/595,406.
EPO Notice of Opposition mailed Apr. 4, 2012, for European Patent No. 1982802, issued from corresponding Application No. 08154594.9 (73 pages, including certified translation).
EPO Notice of Opposition mailed Apr. 19, 2012, for European Patent No. 1982802, issued from corresponding Application No. 08154594.9 (29 pages EP version, 30 pages English translation including certificate).
European Search Report from the European Patent Office regarding Applicant No. EP 08154594, dated Jul. 4, 2008 (5 pages).
www.safecutting.com/klever_kutter.html; Safecutting.com, Safety Knives & Cutters for Reducing Workplace Accidents, MS 994—Klever Kutter Disposable Safety Box Cutter, Dec. 12, 2012, 1 page.
http://kleverinnovations.net/en-us/ourproducts/safetycutters/kleverkutter.aspx; Klever Innovations,Klever Kutter, Dec. 2012, 2 pages.
Partial European Search Report issued in corresponding European Application No. 08153448.9 on Jun. 16, 2008, 4 pages.
European Search Report issued in corresponding European Application No. 08153448.9 on Sep. 19, 2008, 9 pages.
Office Action mailed Jan. 7, 2014, in U.S. Appl. No. 13/765,371 (11 pages).

\* cited by examiner

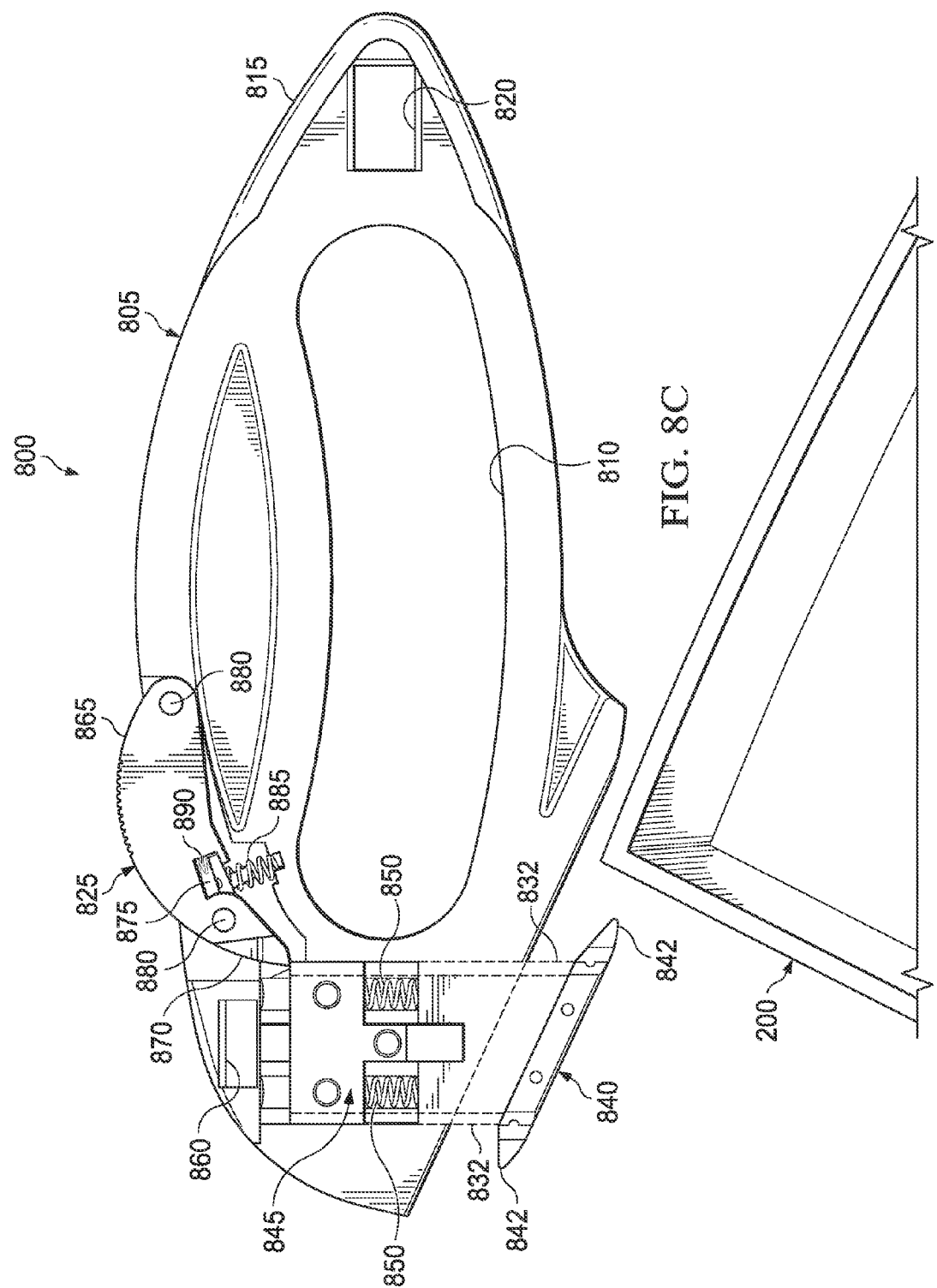

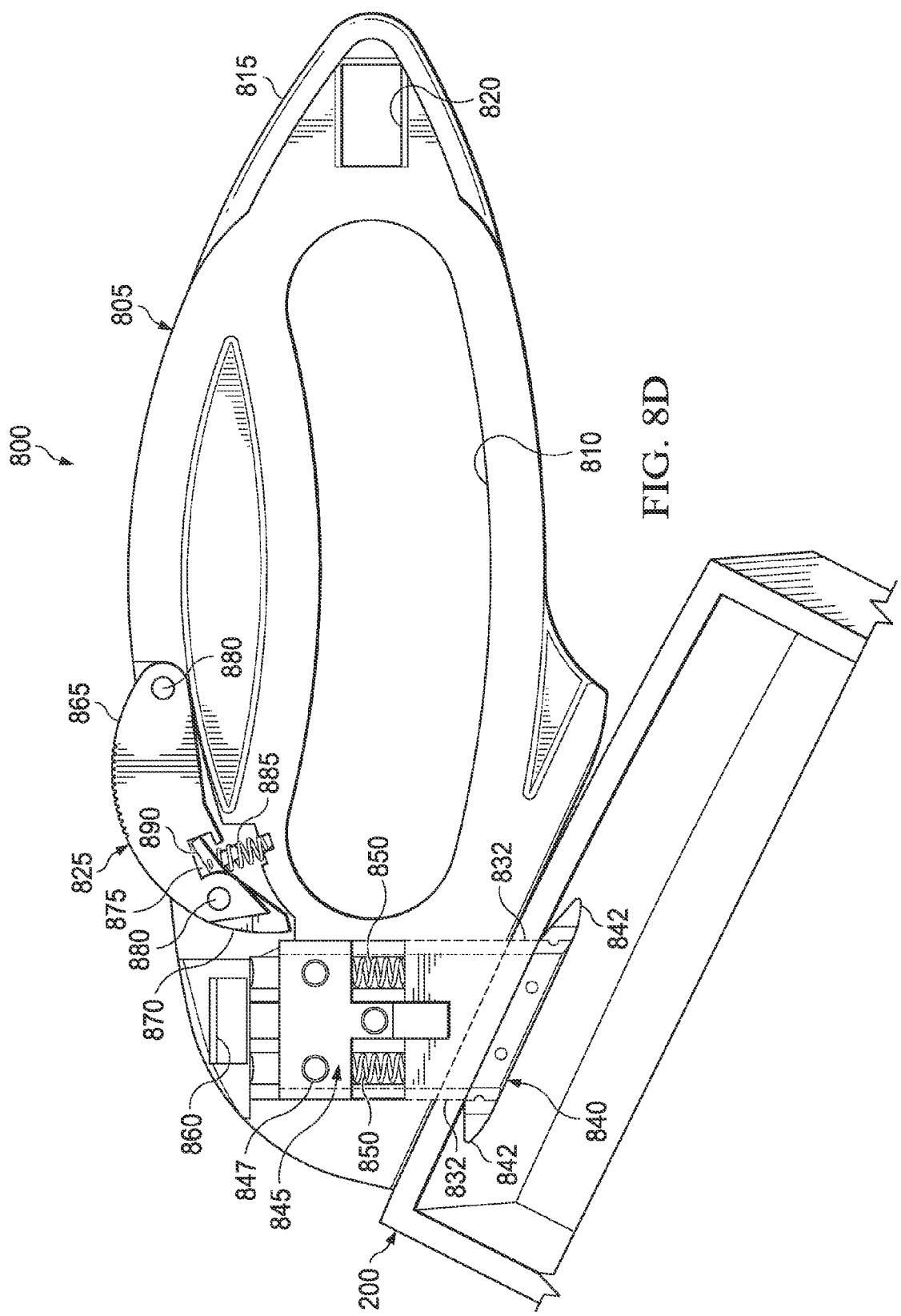

UTILITY CUTTER

CROSS-REFERENCE TO RELATED APPLICATIONS

This application is a continuation application of, and claims priority under 35 U.S.C. §120 to, U.S. application Ser. No. 13/765,371, entitled "Utility Cutter" and filed on Feb. 12, 2013, now issued as U.S. Pat. No. 8,782,909, the entire contents of which is incorporated by reference herein.

TECHNICAL BACKGROUND

This disclosure relates to cutting rigid and semi-rigid materials.

BACKGROUND

Utility cutters may be used to cut or slice a variety of materials, such as cardboard, corrugated board of varying thickness, rubber, lightweight plastic, or other packaging material. In order to cut or slice such material, the utility cutter may need to have a sharpened blade. Certain precautions may be used to protect or help protect a user from the sharpened blade. For example, a utility cutter may include guards that extend from the cutter alongside the sharpened blade, such that the guards substantially prevent an accidental injury to the user or other bystander. Further, a utility cutter may include a protective handle that encloses substantially all of a blade during periods of non-use. Utility cutters, however, may be actuated accidentally even during periods of storage or non-use. Accidental actuation of a utility cutter, therefore, may present a substantial hazard to the user, other persons, or valuable material.

SUMMARY

In one general implementation, a knife includes a handle that includes a gripping surface; a blade slide positioned in a recess of the handle that extends from an opening of the handle through a cavity within the handle; a blade coupled to the blade slide near a proximal end of the blade and extending through the recess and into the opening when the blade slide is in the retracted position; and a guide coupled to the blade near a distal end of the blade opposite the proximal end, the guide including a contoured surface configured to engage a workpiece to extend the blade slide a distance from the retracted position to an extended position such that the blade is extended from the opening of the handle, the blade slide biased to move from the extended position to the retracted position.

In a first aspect combinable with the general implementation, the guide includes at least one pointed edge along the contoured surface, the pointed edge configured to engage the workpiece.

A second aspect combinable with any of the previous aspects further includes a biasing member in contact with the blade slide.

In a third aspect combinable with any of the previous aspects, the biasing member is configured to exert a substantially constant force on the blade slide to bias the slide into the retracted position.

In a fourth aspect combinable with any of the previous aspects, the biasing member includes a first biasing member, the knife further including a second biasing member in contact with the blade slide.

In a fifth aspect combinable with any of the previous aspects, the second biasing member is configured to exert a substantially constant force on the blade slide to bias the slide into the retracted position.

In a sixth aspect combinable with any of the previous aspects, at least one of the first or second biasing members includes a spring.

In a seventh aspect combinable with any of the previous aspects, at least one of the first or second biasing members is at least partially enclosed within the recess.

An eighth aspect combinable with any of the previous aspects further includes a cover coupled to the handle to selectively expose the at least one biasing member and the blade slide to an exterior of the handle.

In a ninth aspect combinable with any of the previous aspects, the blade includes a cutting edge configured to engage the workpiece when the blade slide is in the extended position.

In a tenth aspect combinable with any of the previous aspects, the cutting edge includes a first cutting edge, the blade further including a second cutting edge opposite to the first cutting edge.

In an eleventh aspect combinable with any of the previous aspects, the second cutting edge is configured to engage the workpiece when the blade slide is in the extended position.

In a twelfth aspect combinable with any of the previous aspects, the handle includes a slicing edge.

In a thirteenth aspect combinable with any of the previous aspects, the blade includes titanium-coated carbon steel.

In another general implementation, a method for slicing a material includes engaging a first material with a guide coupled to a blade of a knife, the blade coupled to a blade slide biased to move the blade to a safe position substantially enclosed within a housing of the knife; extending, through engagement of the first material with the guide, the blade a first distance away from the housing of the knife from the safe position to a first cutting position; engaging the first material with the blade to slice the first material; disengaging the blade from the first material; and based on disengagement of the blade from the first material, biasing the blade slide to move the blade from the first cutting position towards the safe position.

A first aspect combinable with the general implementation further includes engaging a second material with the guide, the second material including a different thickness than the first material.

A second aspect combinable with any of the previous aspects further includes extending, through engagement of the second material with the guide, the blade a second distance away from the housing of the knife from the safe position to a second cutting position, the second distance different than the first distance.

A third aspect combinable with any of the previous aspects further includes engaging the second material with the blade to slice the second material; disengaging the blade from the second material; and based on disengagement of the blade from the second material, biasing the blade slide to move the blade from the second cutting position towards the safe position.

In a fourth aspect combinable with any of the previous aspects, the first and second distances are based on the relative thicknesses of the first and second materials.

In a fifth aspect combinable with any of the previous aspects, engaging a first material with a guide coupled to a blade of a knife includes engaging the first material with a pointed edge of the guide to penetrate the first material.

In a sixth aspect combinable with any of the previous aspects, biasing the blade slide to move the blade from the first cutting position towards the safe position includes urging the blade slide from the first cutting position towards the safe position by a spring.

In a seventh aspect combinable with any of the previous aspects, urging the blade slide from the first cutting position towards the safe position by a spring includes urging the blade slide from the first cutting position towards the safe position with a substantially constant spring force.

In an eighth aspect combinable with any of the previous aspects, urging the blade slide from the first cutting position towards the safe position by a spring includes urging the blade slide from the first cutting position towards the safe position without user action.

In a ninth aspect combinable with any of the previous aspects, engaging the first material with the blade to slice the first material includes slicing the first material in a first direction with a first cutting edge of the blade.

A tenth aspect combinable with any of the previous aspects further includes engaging the first material with the guide; extending, through engagement of the first material with the guide, the blade the first distance away from the housing of the knife from the safe position to the first cutting position; and engaging the first material with the blade to slice the first material in a second direction different than the first direction with a second cutting edge of the blade.

An eleventh aspect combinable with any of the previous aspects further includes slicing a flexible material with a slicing edge of the housing of the knife.

In another general implementation, a utility cutter includes a handle that includes a gripping surface and a face surface; a blade shuttle positioned in a recess of the handle that extends from an opening of the handle through a cavity within the handle; a blade coupled, at a proximal end, to the blade shuttle and extending through the recess and into the opening when the blade shuttle is in the retracted position; a guide coupled to a distal end of the blade opposite the proximal end and configured to penetrate a material; and a biasing member configured to urge the guide toward the face surface of the handle by biasing the blade shuttle toward the refracted position, the face surface and guide separated by a gap when the blade shuttle is in the retracted position.

In a first aspect combinable with the general implementation, the gap is sized to receive a portion of the material when the blade shuttle is in the retracted position.

In a second aspect combinable with any of the previous aspects, the biasing member is configured to urge the guide against the portion of the material to compressibly contact the portion of the material between the guide and face surface.

In another general implementation, a method includes receiving a material in a gap between a blade of a knife and a guide of the knife that is coupled to the blade near a proximal end of the blade, the blade coupled to a blade shuttle near a distal end of the blade; engaging the material with the blade of the knife; exerting a compressive force on the material by the guide and a surface of a handle of the knife by biasing the guide toward the surface of the handle with a biasing member that exerts a force on the blade shuttle; and slicing the material with a cutting edge of the blade.

A first aspect combinable with the general implementation further includes engaging another material with the guide; extending, through engagement of the other material with the guide, the blade a distance away from the handle of the knife greater than the gap; engaging the other material with the blade to slice the other material; disengaging the blade from the material; and based on disengagement of the blade from the material, biasing the blade slide to move into a retracted position where the guide is spaced apart from the knife by the gap.

In a second aspect combinable with any of the previous aspects, the distance is based on a thicknesses of the other material.

In a third aspect combinable with any of the previous aspects, engaging another material with the guide includes engaging the other material with a pointed edge of the guide to penetrate the other material.

In a fourth aspect combinable with any of the previous aspects, biasing the blade shuttle to move into a retracted position includes biasing the blade shuttle to move into the retracted position without user action.

Various implementations of a utility cutter according to the present disclosure may include one or more of the following features. The utility cutter may provide for extension of a cutting blade from a housing based on engagement with the blade (or a guide attached to the blade) with a work piece, rather than based on any actuation initiated by a user. Thus, user action (e.g., pushing a blade from a housing through thumb action or a gripping action) may be decreased, thereby allowing the user to save energy, decrease injuries, and/or increase work output cutting or slicing the workpiece. As another example, the cutting blade may be covered (e.g., by a guide and/or cap) to protect the user from contact with the blade while still allowing full use of the cutter. As yet another example, the utility cutter may include automatic retraction of the blade (or a cutting edge portion of the blade) into a housing for safety when the blade is not in use (e.g., engaging a workpiece). The blade may be a replaceable blade as well, thereby being more cost effective. As another example, the cutter may be configured so that only a cutting edge of the blade engages the workpiece, thereby limiting a force necessary to cut the workpiece with the blade.

Various implementations of a utility cutter according to the present disclosure may also include one or more of the following features. The utility cutter may not have a fixed depth of cut but may instead have a variable depth of cut. The depth of cut may be varied to a particular depth depending on a thickness of the material to be cut (e.g., single wall corrugated board, double wall corrugated board, triple wall corrugated board, or other material, like cellophane tape, or other adhesive material). The depth of cut may be determined by the cutter automatically or semi-automatically without additional action by the user beyond engagement of the material with the cutter. As another example, the cutter may allow for piercing of a material without blade engagement of the material to initiate a slice or cut, thereby reducing wear on the blade and possible injury to the user. In some implementations, the cutter may be made of washable material that reduces waste, dirt, and other materials from penetrating into an interior housing of the cutter.

These general and specific aspects may be implemented using a device, system or method, or any combinations of devices, systems, or methods. The details of one or more implementations are set forth in the accompanying drawings and the description. Other features, objects, and advantages will be apparent from the description and drawings, and from the claims.

DESCRIPTION OF DRAWINGS

FIGS. 8A-8E illustrate various views of another example implementation of a utility cutter that includes a trigger in various positions;

DETAILED DESCRIPTION

Figure 1:
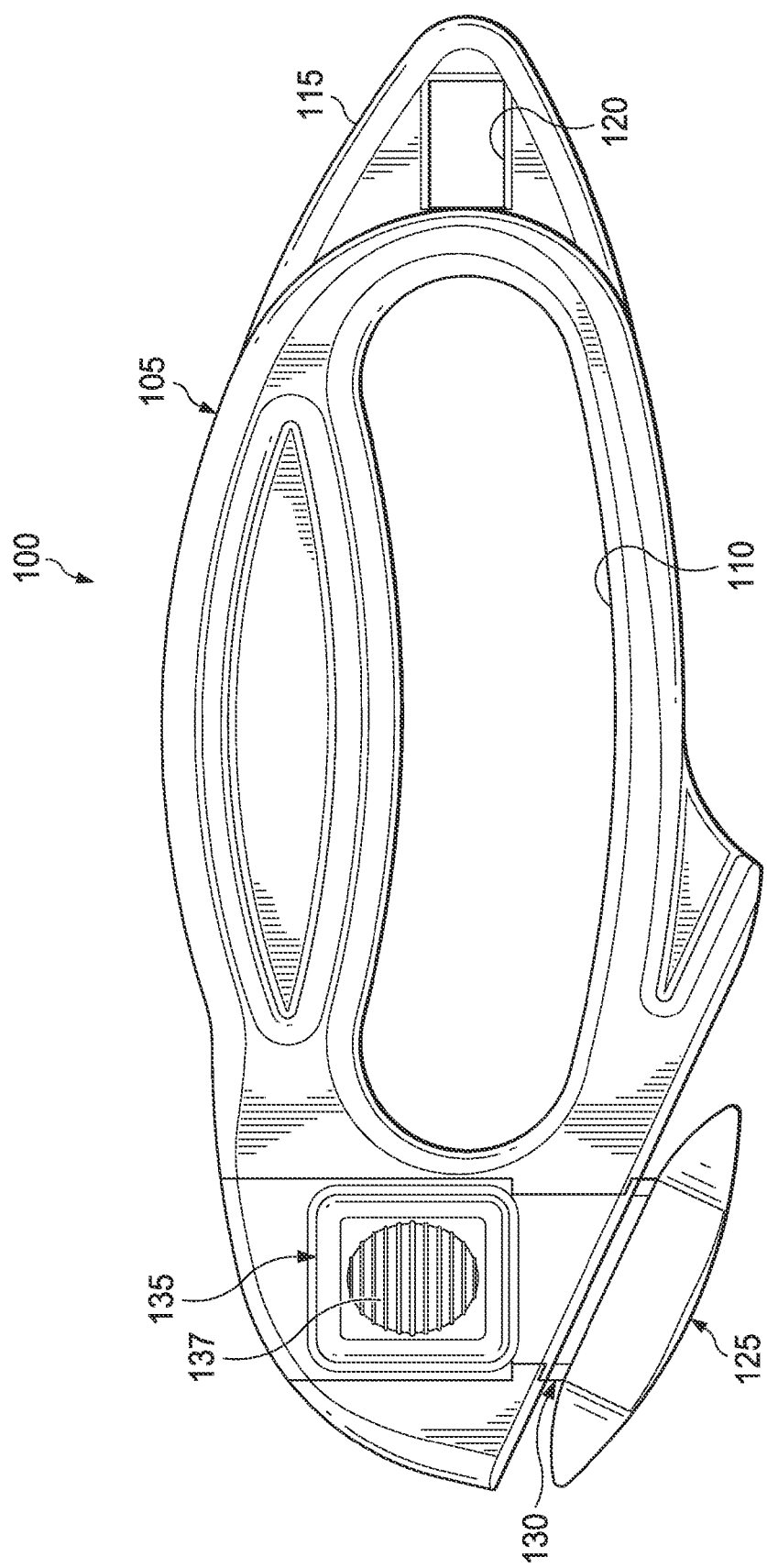
FIG. 1 illustrates a side view of an example implementation of a utility cutter.

The figures and following description illustrate and explain a utility cutter 100, which may be used to cut rigid or semi-rigid materials, such as, for example, corrugated board, cardboard or other paper products, rubber, plastic, Styrofoam, or any other appropriate material. The utility cutter 100 is typically a handheld device operated by either a left-handed or right-handed user with equal ease. In some implementations, the utility cutter 100 allows the user to carry, transport, or otherwise handle the cutter 100 in a safe position, whereby a sharpened blade of the cutter 100 is enclosed or substantially enclosed within a protective housing or handle. The user may, as appropriate, engage the cutter 100 into a material by engaging a guide attached to the blade into the material. Once engaged, the guide may extend the blade from the housing to expose a cutting edge of the blade to the material. Once the user finishes cutting the material as desired, the user may disengage the blade and the guide from the material. Once disengaged, the blade may be automatically retracted within the protective handle by a biasing force to ensure that the blade is no longer exposed and able to cause injury to the user or other person, and/or the material previously cut. This automatic retraction of the blade may occur without any action taken by the user.

With reference to FIGS. 1-6, an example implementation of a utility cutter 100 is shown in various views (e.g., side, end, and exploded) and in various positions (e.g., retracted and extended). As illustrated, the utility cutter 100 includes a handle (or housing) 105 that provides a gripping surface for a user of the utility cutter 100. In some aspects, the handle 105 may be manufactured to promote cleaning and sterilization of the utility cutter 100, such as, for example, through the use of non-corrosive materials (e.g., stainless steel, aluminum, plastic, or other non-corrosive and/or inert material) and/or with open contours substantially free from undercuts (e.g., to eliminate or partially eliminate material being trapped in or on the utility cutter 100). For example, in some aspects, the handle 105 (e.g., a solid, unibody structure) may be machine washable (e.g., through a dishwasher).

In the illustrated embodiment, the handle 105 includes a hand grip 110 that includes a substantially oval aperture through the handle 105. The hand grip 110 may be sized to accommodate several fingers of an adult hand of a user so that the user may securely grip the utility cutter 100 during cutting or slicing of a material. The illustrated handle 110 also includes a "knuckle" cover 107 (as shown in FIG. 1) that protects a user's fingers from contact with, for example, a material that may include sharp edges, staples, or other injury-causing surfaces.

The illustrated handle 105 further includes an edge 115 that extends along at least a portion of a contoured surface of the handle 105. The edge 115, in some implementations, may be sharpened (e.g., a 0.010 inch dull edge) relative to the contoured surface. Although the edge 115 may still be dull enough so as to prevent cutting or slicing of the user, the edge 115 may be sharp enough to slice through other flexible materials, such as, for example, cellophane tape or other packing tape that does not lend itself to efficient cutting with a sharpened blade (e.g., the blade 130).

The illustrated handle 105 may further include a hook 120 that includes an aperture through the handle 105 at a particular location. In FIG. 1, for example, the hook 120 is positioned at an end of the handle opposite the blade 130. In some aspects, the hook 120 may facilitate hanging the utility cutter 100 from, for example, a stationary structure such as a wall, as well as a user's belt or other clothing. The hook 120, therefore, may help the user find the utility cutter 100 and/or help prevent misplacement of the utility cutter 100.

Figure 2A:
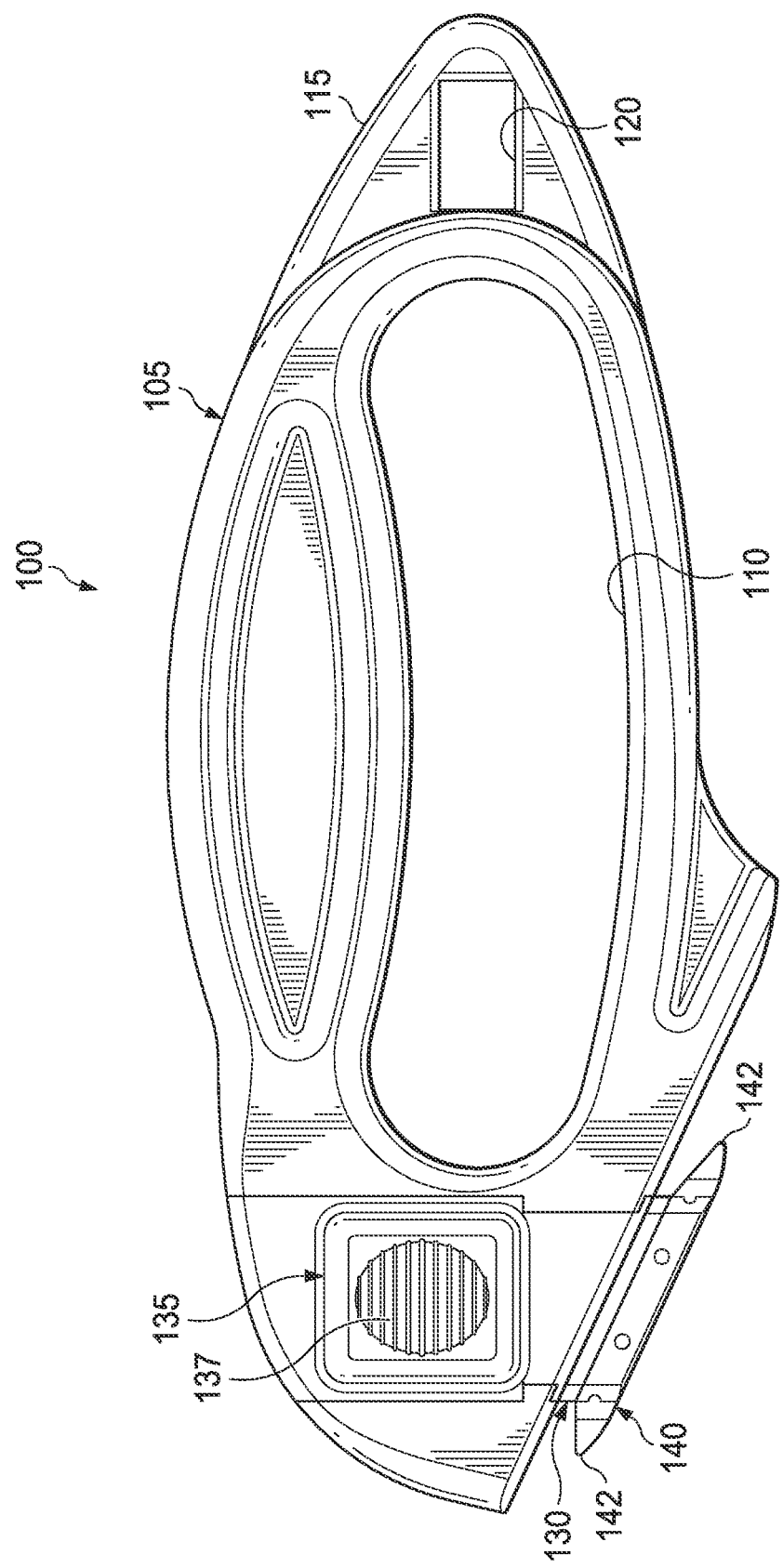
FIG. 2A illustrates a side view of an example implementation of a utility cutter in a retracted or safe position.

As illustrated in FIGS. 1 and 2A, the utility cutter 100 is shown in a retracted position in which all or most of the blade 130 is withdrawn into the handle 105. In FIG. 1., the blade 130 is illustrated as covered with a cap 125. Although a small portion of the blade 130 is shown in FIG. 1 as extending from the handle 105, in some aspects, in the retracted (or safe) position, the blade 130 may be enclosed within the handle 105 such that none of the blade 130 is visible outside of the handle 105 and the cap 125 is flush against the handle 105. Alternatively, in some aspects, in the retracted position, the blade 130 may extend a distance (e.g., 1/16 inch) from the handle 105, thereby creating a gap between the guide 140 and the handle 105 (e.g., angled surfaces 170 and 175 shown in FIG. 5). Based on the gap, for instance, the utility cutter 100 may be operable to cut or slice various materials (e.g., cellophane tape, straps, rope, cords, and otherwise) that fit within the gap.

The cap 125, as illustrated, may provide a protective barrier over at least a portion of the blade 130 and, in some aspects, a guide 140 coupled to the blade 130. Removal of the cap 125 exposes the guide 140, as illustrated in FIG. 2A for example. In some implementations, the guide 140 is coupled to (e.g., permanently or semi-permanently) or integral with the blade 130. The guide 140 includes a ramp angle that terminates in points 142 (e.g., dull points of 0.005 inch) on either end of the guide 140. The points 142, in some aspects, may be configured to pierce a material so as to provide an initial cut through which the blade 130 my extend to begin further cutting or slicing. Further, the guide 140, and in some aspects the points 142 specifically, may provide for a catch that, when engaged with a material, forcibly extends the blade 130 from the handle 105 (as described below).

Figure 3:
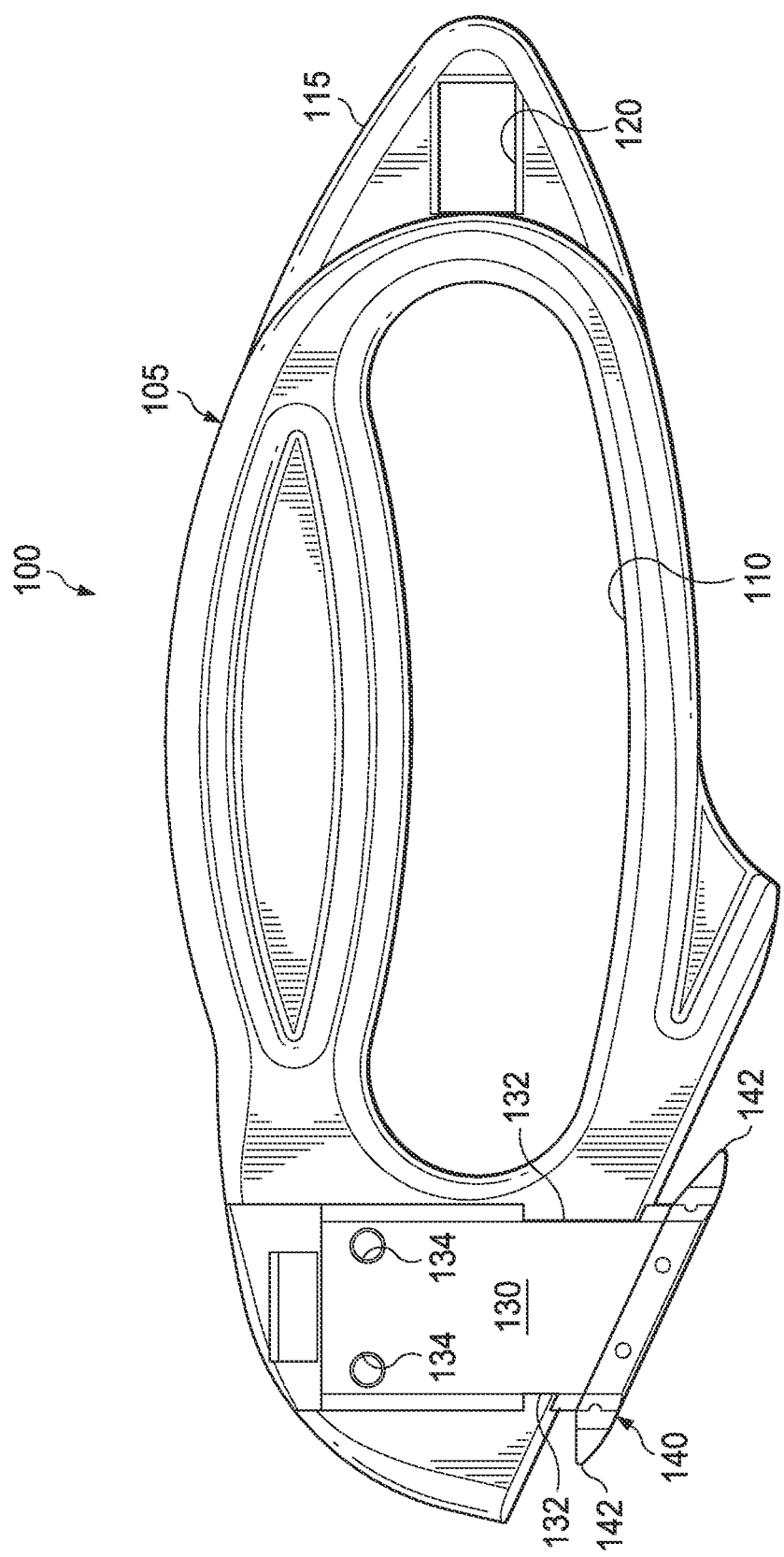
FIGS. 3-4 illustrate side views of an example implementation of a utility cutter with portions of the cutter exposed for better viewing.
Figure 4:
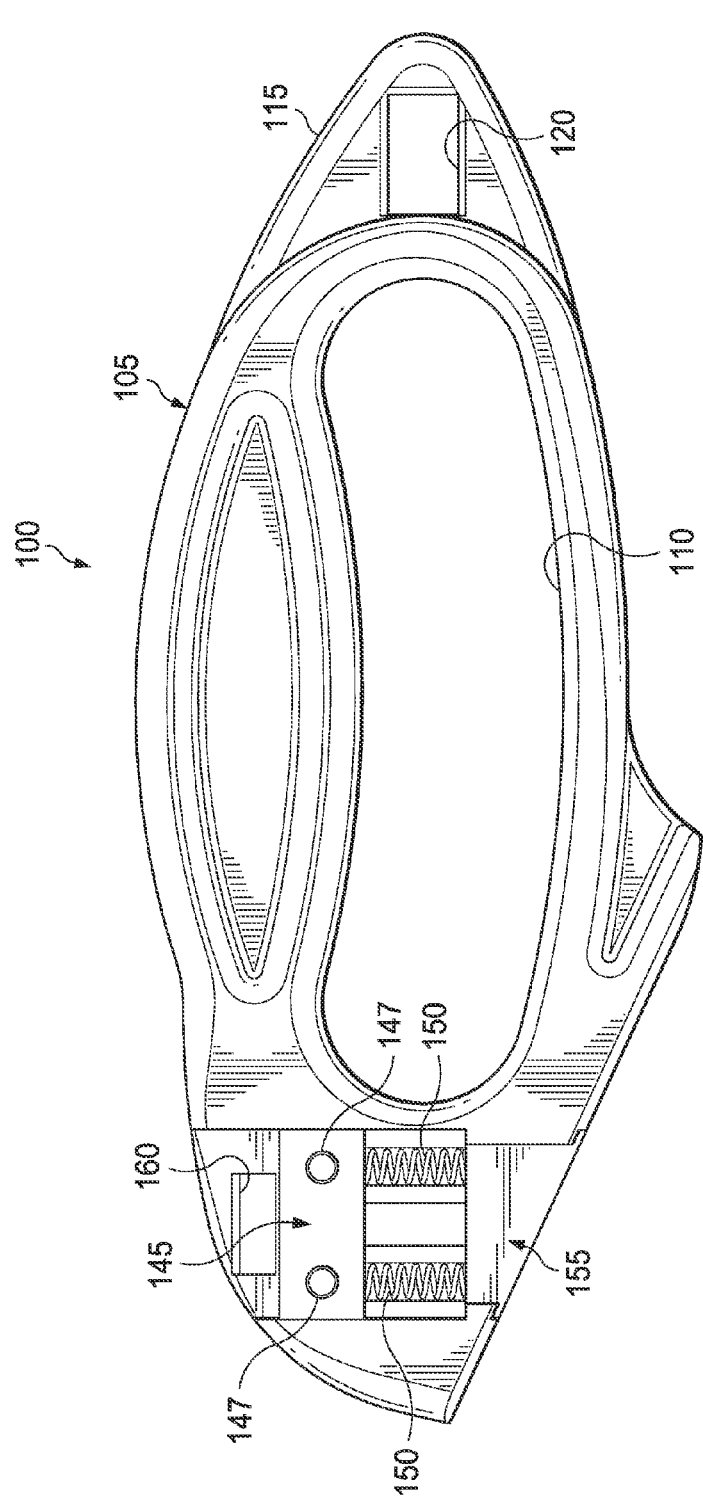

The illustrated implementation of the utility cutter 100 includes a cover 135 that is removably engaged with the handle 105. The cover 135, as illustrated, includes a ridged surface 137 to promote contact between the cover 135 and a user (e.g., a user's thumb). The ridged surface 137 may provide at least two purposes. First, the ridged surface 137 may provide a rest for a user's thumb during use (e.g., slicing or cutting) of the utility cutter 100. To that end, each side of the utility cutter 100 may include a ridged surface 137 such as the ridged surface 137 shown in FIG. 1, which illustrates one side of the utility cutter 100. The ridged surface 137 may also provide a friction point for a user to exert force to remove the cover 135 from the handle 105. For example, as shown in FIGS. 3-4, removal of the cover 135 from the handle 105 may expose components of the utility cutter 100 that are positioned in a cavity 155 in the handle 105. In some aspects, the blade 130 may be removed and replaced by removing the cover 135 from the handle 105.

The cover 135 may be coupled to the handle 105 with a latch 139 that engages with a notch 160 in the handle 105. In some aspects, the latch 139 is an integrated latch that will automatically engage when the cover 135 is closed, and can be disengaged by applying pressure against the latch 139 to decouple the latch 139 from the notch 160. Once disengaged, the cover 135 may be pulled away from the handle 105 (e.g., pivoting the cover 135 away from the notch 160).

Turning to FIGS. 3-4 in particular, once the cover 135 is removed, other components of the utility cutter 100 may be exposed. As illustrated, the blade 130 extends into the recess (or cavity) 155 and is engaged to a blade slide 145. In the illustrated implementation, the blade 130 includes two holes 134 that slip over posts 147 of the blade slide 145 in order to couple the blade 130 to the blade slide 145. More or fewer posts 147 may be used. Further, in some aspects, the blade 130 may be integral with the blade slide 145, thereby requiring replacement of both components when the blade 130 becomes dull. In the illustrated implementation, however, the blade 130 may be replaced alone by slipping the blade 130 from the posts 147. In some aspects, the blade 130 may be made of carbon steel and coated with titanium to improve wear resistance and blade life.

As illustrated, the blade 130 include cutting edges 132 located on two sides (opposed) of the blade 130. Multiple cutting edges 132 may provide for both "pull" and "push" cutting or slicing without the user having to rotate the utility cutter 100 relative to the material being engaged. Further, multiple cutting edges 132 may provide for an extended life of the blade 130 and less wear on the blade 130. In alternative implementations, the blade 130 may include only a single cutting edge 132. In the illustrated implementation, a lower cutting edge 132 is adjacent the knuckle cover 107 while an upper cutting edge 132 is on the opposite side of the blade 130. Each cutting edge 132 may offer distinct cutting features. For example, the upper cutting edge 132 may offer the capability of performing a plunge cut into a flat side of a work piece or material. The lower cutting edge 132 may offer the capability of performing a side cut on the edge of a work piece or material.

Figure 5:
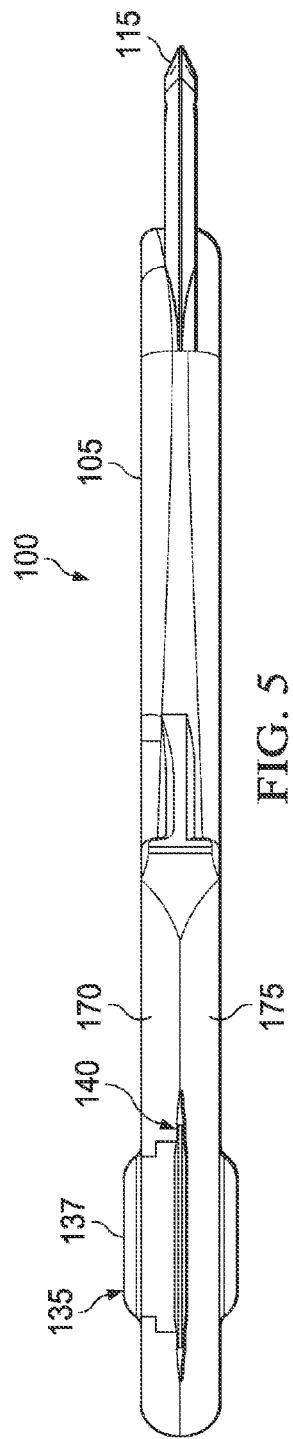
FIG. 5 illustrates an end view of an example implementation of a utility cutter.

Turning briefly to FIG. 5, the handle 105 may include angled surfaces 170 and 175 that are located on either side of the blade 130. In some aspects, the angled surfaces 170 and 175 may define (or help define) an angle of cut of the blade 130 into and/or through a material (e.g., corrugated board or other material). For example, in some aspects, and as shown in FIG. 5, the surfaces 170 and 175 define a cutting table area, with a drop-off (e.g., about 105 degrees but may be other angles) relative to the flat side of the blade 130 on each side of the blade 130. The drop-off on each side of the blade 130 may provide for a compound angle of cut for improved wear and with less resistance of cut.

Figure 6:
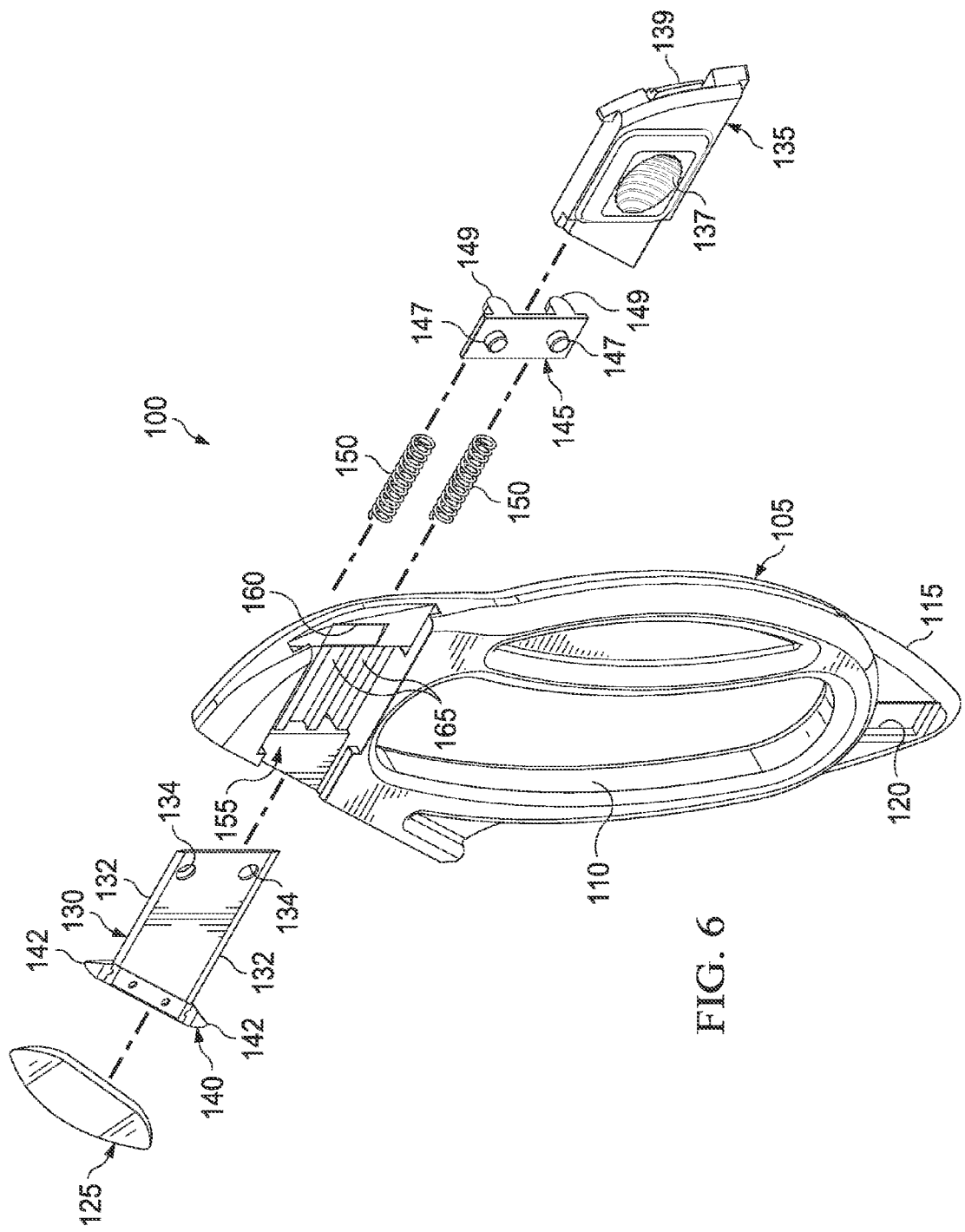
FIG. 6 illustrates an exploded view of an example implementation of a utility cutter.

Turning to FIGS. 4 and 6, removal of the blade 130 from the blade slide 145 reveals biasing members 150 that are positioned in respective troughs 165 in the cavity 155. As illustrated, in this implementation, the biasing members 150 are compression springs. Alternative implementations may include other forms of biasing members (e.g., elastic members), as well as more or fewer biasing members 150. In the illustrated implementation, two biasing members 150 are used, for example, to offer the blade slide 145 increased stability during movement as well as provide substantially equal force on the blade slide 145 in both cutting directions (e.g., with a blade 130 having two cutting edges 132). As shown more clearly in FIG. 6, the biasing members 150 are positioned in the troughs 165 and constrained at one end by a wall of the troughs 165 and at an opposite end by stops 149 of the blade slide 145.

In operation, a user may grip the utility cutter 100 and, with the cap 125 removed from guide 140, engage a material with a point 142 of the guide 140. Prior to engagement and at an instant of engagement of the guide 140 with the material, the utility cutter 100 may be in the retracted or safe position as shown in FIG. 2A. In the retracted position, the blade 130 may be fully or substantially enclosed within the cavity 155 such that none or only a small portion of the cutting edges 132 of the blade 130 are exposed. The biasing members 150 may exert a force (e.g., substantially constant) against the stops 149 of the blade slide 145 so as to bias the blade slide 145 in a direction opposite the guide 140. In the retracted position, the biasing members 150 (or member 150 in the case of a single member 150) bias the blade slide 145 to a position furthest from the guide 140 as possible.

Figure 2B:
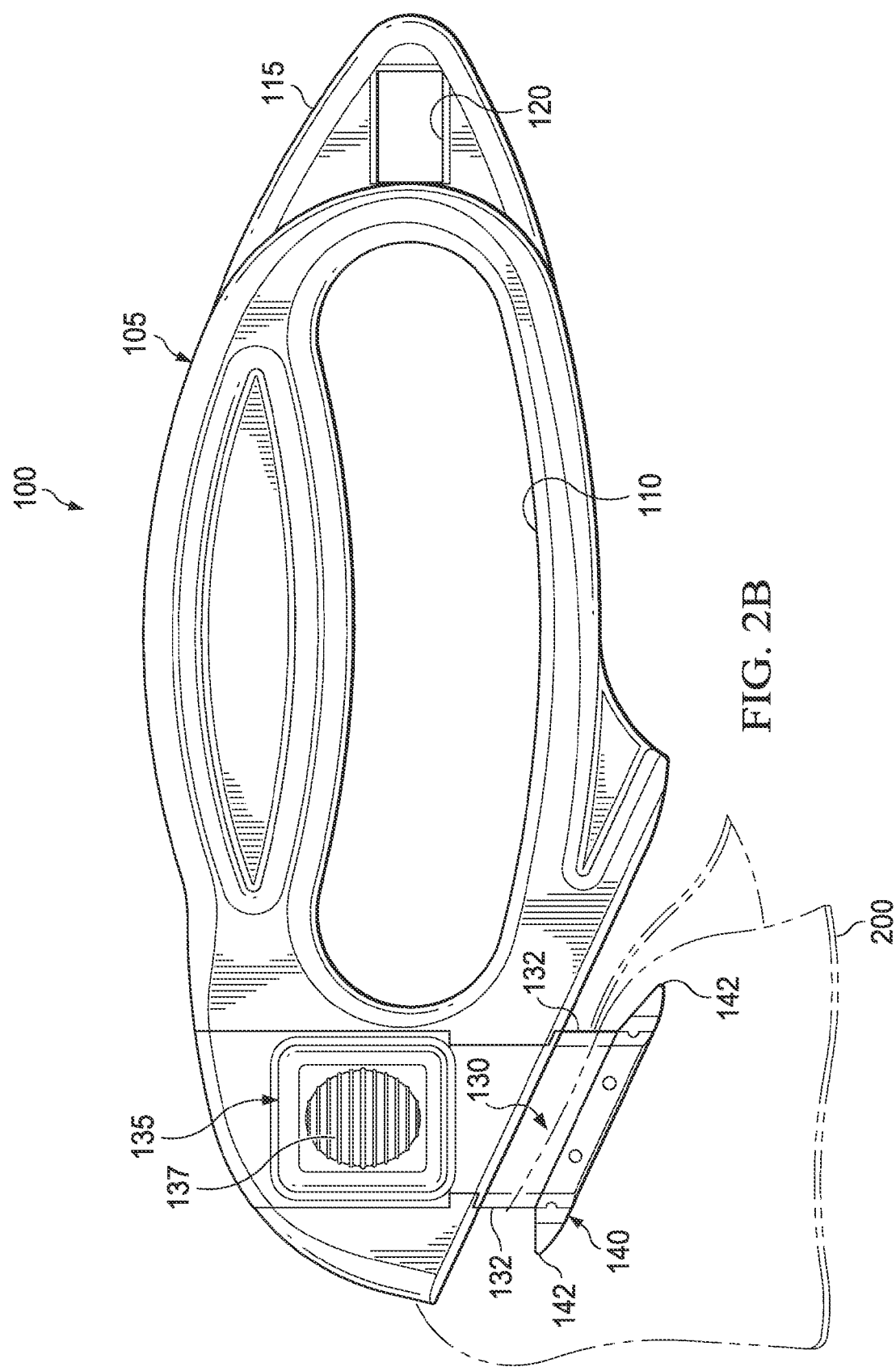
FIG. 2B illustrates a side view of an example implementation of a utility cutter in an extended or cutting position.

Turning to FIG. 2B, as the guide 140 engages the material, and in some aspects, penetrates the material with the point 142 of the guide 140, the blade 130 is extended from the cavity 155 into an extended or cutting position. For example, the blade 130 is extended as a frictional force between the guide 140 and material overcomes a force exerted on the blade slide 145 by the biasing members 150. For instance, the frictional force or contact force between the guide 140 and material 200 is directed opposite of the biasing force exerted on the blade slide 145 and extends the blade 130 so that a cutting edge 132 engages the material 200. In the example implementation, therefore, extension of the blade 130 may occur without user action to extend the blade slide 145 and thus the blade 130 from the retracted position, and extension of the blade 130 may occur, in some aspects, solely through contact between the guide 140 and the material 200.

The material 200 may be of varying thickness or, in some aspects, operation of the utility cutter 100 may occur on various materials of different thicknesses. In some aspects, the extended or cutting position, and the distance the blade 130 is extended from the handle 105, may depend on the thickness of the material engaged with the guide 140. For instance, as the guide 140 engages (e.g., penetrates through) a relatively thin material, such as single wall corrugated board, the force generated to extend the blade 130 from the cavity 155 may be sufficient to extend the blade 130 just enough to cut or slice the single wall corrugated board. But as the guide 140 engages (e.g., penetrates through) a thicker material, such as double or triple wall corrugated board, the force generated to extend the blade 130 from the cavity 155 may be sufficient to extend the blade 130 enough to cut or slice the thicker material. As the blade 130 cuts or slices the material, the thicker the material, the greater a frictional force between the material and blade 130 may be generated to maintain the blade 130 extended from the handle 105. Thus, the utility cutter 100 may include a variable depth of cut of the blade 130 that conforms to a necessary depth depending on the material thickness without any necessary action to be taken on the part of the user.

Once engaged with the material 200, as shown in FIG. 2B, the cutting edge 132 may slice or cut the material as necessary. As described above, with a blade 130 that includes two cutting edges 132, slices or cuts may be made bi-directionally in the material 200. During slicing or cutting, the guide 140 may separate the blade 130 from, for example, a product stored inside of a container made of the material 200. Thus, clearance is created between the product and the blade 130, preventing product damage.

When the slice or cut is completed, the user may pull the blade 132 from the material 200, and the guide 140 may disengage the material 200. Once disengaged, the blade slide 145 may be biased by the biasing members 150 to retract the blade 130 into the safe position (as shown in FIG. 2A).

Figure 7:
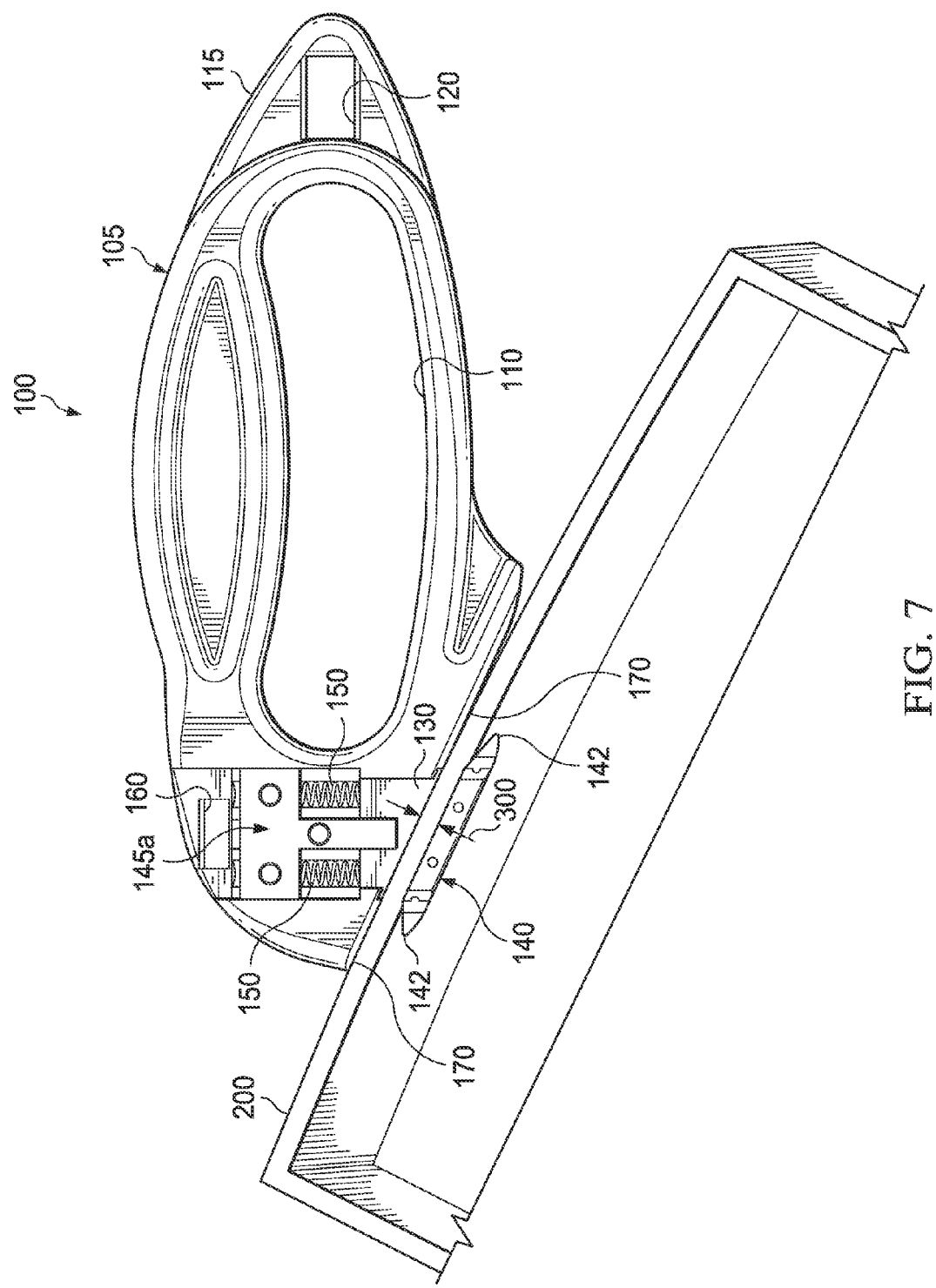
FIG. 7 illustrates a side view of an example implementation of a utility cutter that is engaged with a material.

FIG. 7 illustrates a side view of an example implementation of the utility cutter 100 that is engaged with a material 200. FIG. 7 illustrates a compressive force 300 exerted on a portion of the material 200 that is pinched between the guide 140 and the surfaces 170/175 of the handle 110 during cutting of the material 200 by the cutting edge 132. In some aspects, the compressive force 300 may facilitate a cleaner and easier cut of the material 200, thereby increasing the efficiency of the user's work and decreasing wear on the user and the cutting edge 132.

More specifically, as illustrated, when the utility cutter 100 is engaged with the material 200, the guide 140 penetrates through the material 200 in order to expose the material 200 to the cutting edge 132. The biasing members 150 urge a blade slide 145a towards the notch 160 and away from the guide 140. As shown in this figures, the blade slide 145a is different than the blade slide 145 in that the blade slide 145a is t-shaped and includes three pins 147 instead of two pins 147.

As the blade slide 145a is urged away from the guide 140 and is also coupled to the blade 130, the blade 130 is urged to pull the guide 140 (that is attached to or integral with the blade 130) against the material 200 to create the compressive force 300. The material 200, therefore, is sandwiched between the guide 130 and the handle 110 and compressed to promote easier slicing and cutting of the material 200.

FIGS. 8A-8E illustrate various views of another example implementation of a utility cutter 800 that includes a trigger assembly 825 in various positions. In contrast to the implementations shown in previous figures, which do not include a trigger, the utility cutter 800 includes the trigger assembly 825 that may be actuated (e.g., by a user) to adjust a blade 830 from, for example, a retracted position to an extended position to cut or slice a material. In some aspects, the utility cutter 800 may include an automatic retraction of the blade 830 into a handle 805 even when the trigger assembly 825 is actuated by the user (as described below).

As illustrated, the utility cutter 800 includes a handle (or housing) 805 that provides a gripping surface for a user of the utility cutter 800. In some aspects, the handle 805 may be manufactured to promote cleaning and sterilization of the utility cutter 800, such as, for example, through the use of non-corrosive materials (e.g., stainless steel, aluminum, plastic, or other non-corrosive and/or inert material) and/or with open contours substantially free from undercuts (e.g., to eliminate or partially eliminate material being trapped in or on the utility cutter 800). For example, in some aspects, the handle 805 (e.g., a solid, unibody structure) may be machine washable (e.g., through a dishwasher).

In the illustrated embodiment, the handle 805 includes a hand grip 810 that includes a substantially oval aperture through the handle 805. The hand grip 810 may be sized to accommodate several fingers of an adult hand of a user so that the user may securely grip the utility cutter 800 during cutting or slicing of a material. The illustrated handle 810 may also include a "knuckle" cover (such as the knuckle cover 107 shown in FIG. 1) that protects a user's fingers from contact with, for example, a material that may include sharp edges, staples, or other injury-causing surfaces.

The illustrated handle 805 further includes an edge 815 that extends along at least a portion of a contoured surface of the handle 805. The edge 815, in some implementations, may be sharpened (e.g., a 0.010 inch dull edge) relative to the contoured surface. Although the edge 815 may still be dull enough so as to prevent cutting or slicing of the user, the edge 815 may be sharp enough to slice through other flexible materials, such as, for example, cellophane tape or other packing tape that does not lend itself to efficient cutting with a sharpened blade (e.g., the blade 830).

Figure 8A:
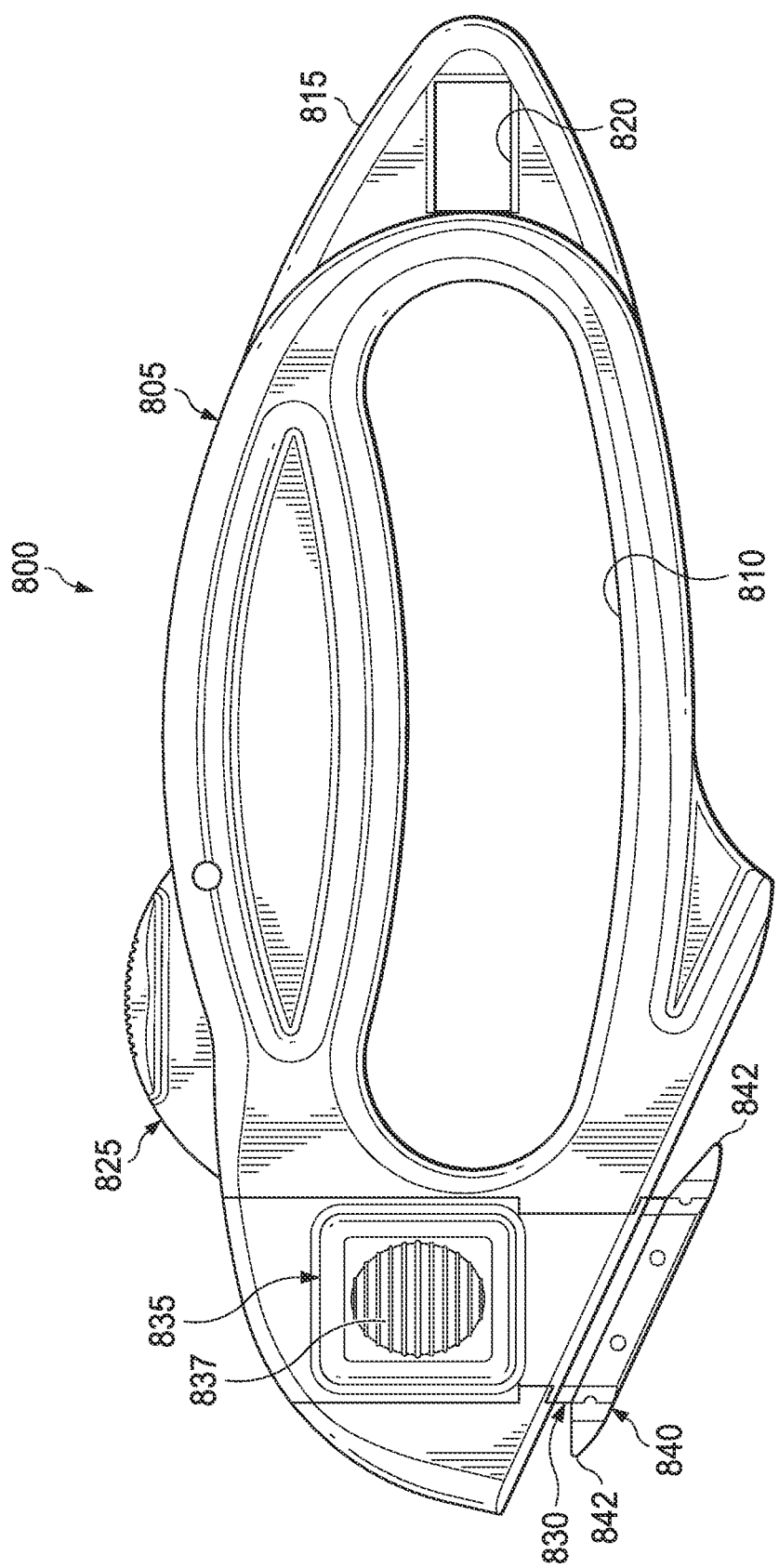

The illustrated handle 805 may further include a hook 820 that includes an aperture through the handle 805 at a particular location. In FIG. 8A, for example, the hook 820 is positioned at an end of the handle opposite the blade 830. In some aspects, the hook 820 may facilitate hanging the utility cutter 800 from, for example, a stationary structure such as a wall, as well as a user's belt or other clothing. The hook 820, therefore, may help the user find the utility cutter 800 and/or help prevent misplacement of the utility cutter 800.

Figure 8B:
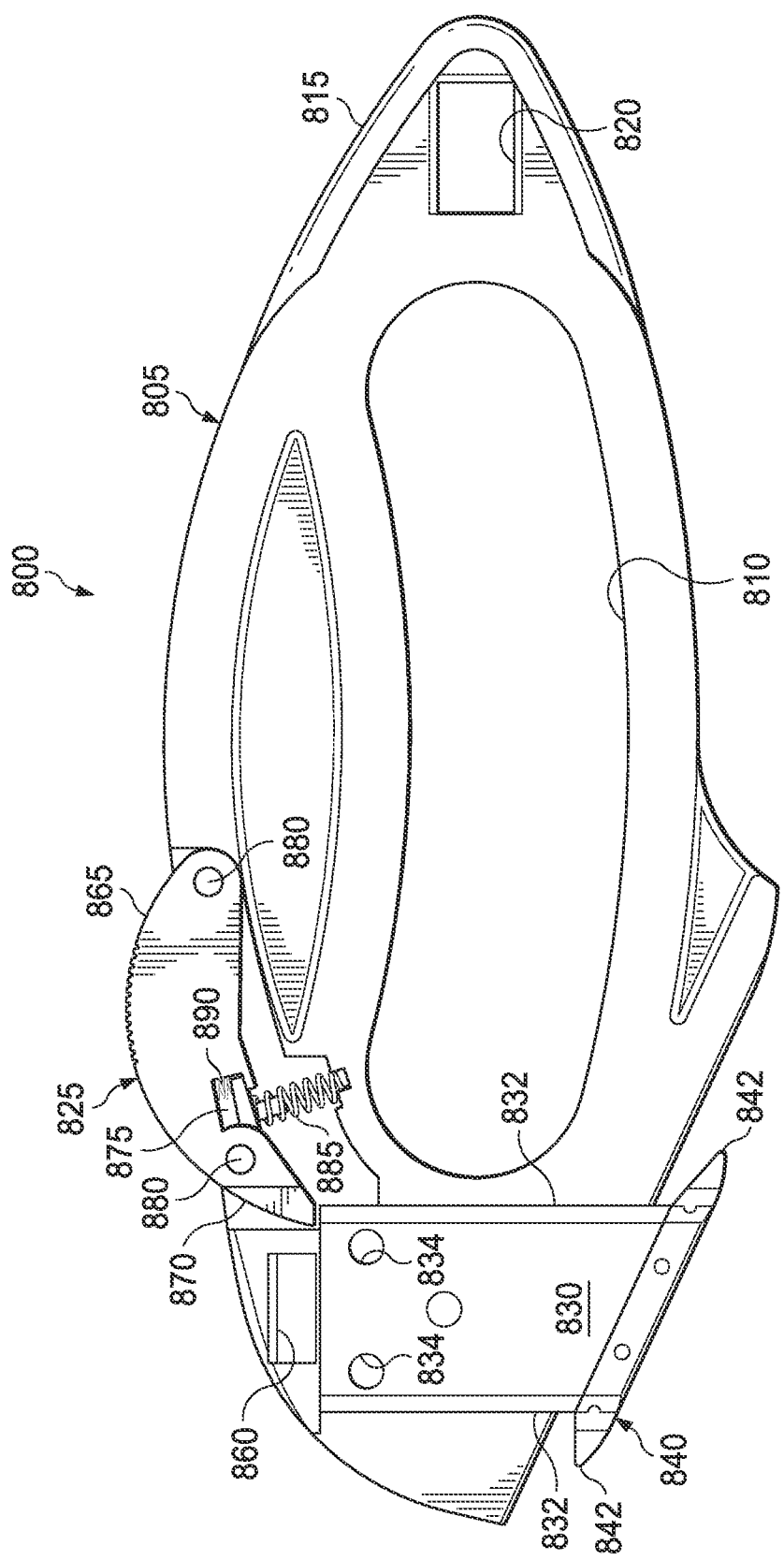

As illustrated in FIGS. 8A and 8B, for example, the utility cutter 800 is shown in a retracted position in which all or most of the blade 830 is withdrawn into the handle 805. Although a small portion of the blade 830 is shown in FIG. 8A as extending from the handle 805, in some aspects, in a retracted (or safe) position, the blade 830 may be enclosed within the handle 805 such that none of the blade 830 is visible outside of the handle 805 and a guide 840 that is integrally mounted on the blade 830 is substantially flush against the handle 805. Alternatively, in some aspects, in the retracted position, the blade 830 may extend a distance (e.g., 1/16 inch) from the handle 805, thereby creating a gap between the guide 840 and the handle 805. Based on the gap, for instance, the utility cutter 800 may be operable to cut or slice various materials (e.g., cellophane tape, straps, rope, cords, and otherwise) that fit within the gap.

In some implementations, the guide 840 is coupled to (e.g., permanently or semi-permanently) or integral with the blade 830. The guide 840 includes a ramp angle that terminates in points 842 (e.g., dull points of 0.005 inch) on either end of the guide 840. The points 842, in some aspects, may be configured to pierce a material so as to provide an initial cut through which the blade 830 my extend to begin further cutting or slicing. Further, the guide 840, and in some aspects the points 842 specifically, may provide for a catch that, when engaged with a material, forcibly extends the blade 830 from the handle 805 (as described below).

The illustrated implementation of the utility cutter 800 includes a cover 835 that is removably engaged with the handle 805. The cover 835, as illustrated, includes a ridged surface 837 to promote contact between the cover 835 and a user (e.g., a user's thumb). The ridged surface 837 may provide at least two purposes. First, the ridged surface 837 may provide a rest for a user's thumb during use (e.g., slicing or cutting) of the utility cutter 800. To that end, each side of the utility cutter 800 may include a ridged surface 837 in some implementations. The ridged surface 837 may also provide a friction point for a user to exert force to remove the cover 835 from the handle 805. For example, as shown in FIGS. 8B-8D, removal of the cover 835 from the handle 805 may expose components of the utility cutter 800 that are positioned in a cavity 855 in the handle 805. In some aspects, the blade 830 may be removed and replaced by removing the cover 835 from the handle 805.

The cover 835 may be coupled to the handle 805 with a latch 839 that engages with a notch 860 in the handle 805. In some aspects, the latch 839 is an integrated latch that will automatically engage when the cover 835 is closed, and can be disengaged by applying pressure against the latch 839 to decouple the latch 839 from the notch 860. Once disengaged, the cover 835 may be pulled away from the handle 805 (e.g., pivoting the cover 835 away from the notch 860).

Turning to FIGS. 8B-8D, sectional views of the utility cutter 800 are illustrated, in which the trigger assembly 825 is exposed for illustrative purposes. The trigger assembly 825 includes, as illustrated, a trigger 865 that is pivotally coupled to the handle 805 through a pin 880 and is also pivotally coupled to a pawl 870 through another pin 880. A portion of the pawl 870 extends into a cavity 875 of the trigger 865 to define a fulcrum, on which a biasing member 885 and a biasing member 890 act.

FIG. 8B illustrates the utility cutter 800 in a retracted or safe position in which the blade 830 is unextended from the handle 805 and the pawl 870 is not in contact with a blade shuttle 845 (shown in FIG. 8C) that is coupled to the blade 830 through posts 847 that are inserted into holes 834. The trigger 865 is shown in a rest position. The blade 830 is urged into the retracted position by biasing members 850 that are in contact with the blade shuttle 845 and urge the blade shuttle 845 (and thus blade 830) towards the trigger assembly 825.

FIG. 8C illustrates the utility cutter 800 in an extended or forward position in which a user has actuated the trigger assembly 825 to contact the blade shuttle 845 to extend the blade 830 from the handle 805. In such a position, for instance, the point 842 of the guide 840 may be in a position to engage the material 200 in order to begin a cut or slice. As illustrated, the trigger 865 is pivoted by the user (e.g., through thumb engagement) at the pin 880 to compress the biasing member 885 (e.g., a compression spring) with the pawl 870. Further, as the pawl 870 contacts the blade shuttle 845 to urge the blade 830 from the handle 805, the biasing members 850 are also further compressed.

FIG. 8D illustrates the utility cutter 800 in a cutting position, with a cutting edge 832 of the blade 830 engaged in the material 200. As illustrated, due to engagement of the blade 830 with the material 200 (e.g., through frictional engagement), the blade 830 and thus blade shuttle 845 is extended a distance toward the material 200 so that the pawl 875 is released from contact with the blade shuttle 845. In this released position, the pawl 875 is misaligned from the blade shuttle 845 in its return path to the retracted position, thereby providing no impediment to retraction of the blade shuttle 845 and the blade 830 once the blade 830 becomes disengaged from the material 200. Thus, the blade 830 may be automatically retracted into the handle 805 (all or substantially all) even if the user continually actuates the trigger assembly 825.

Figure 8E:
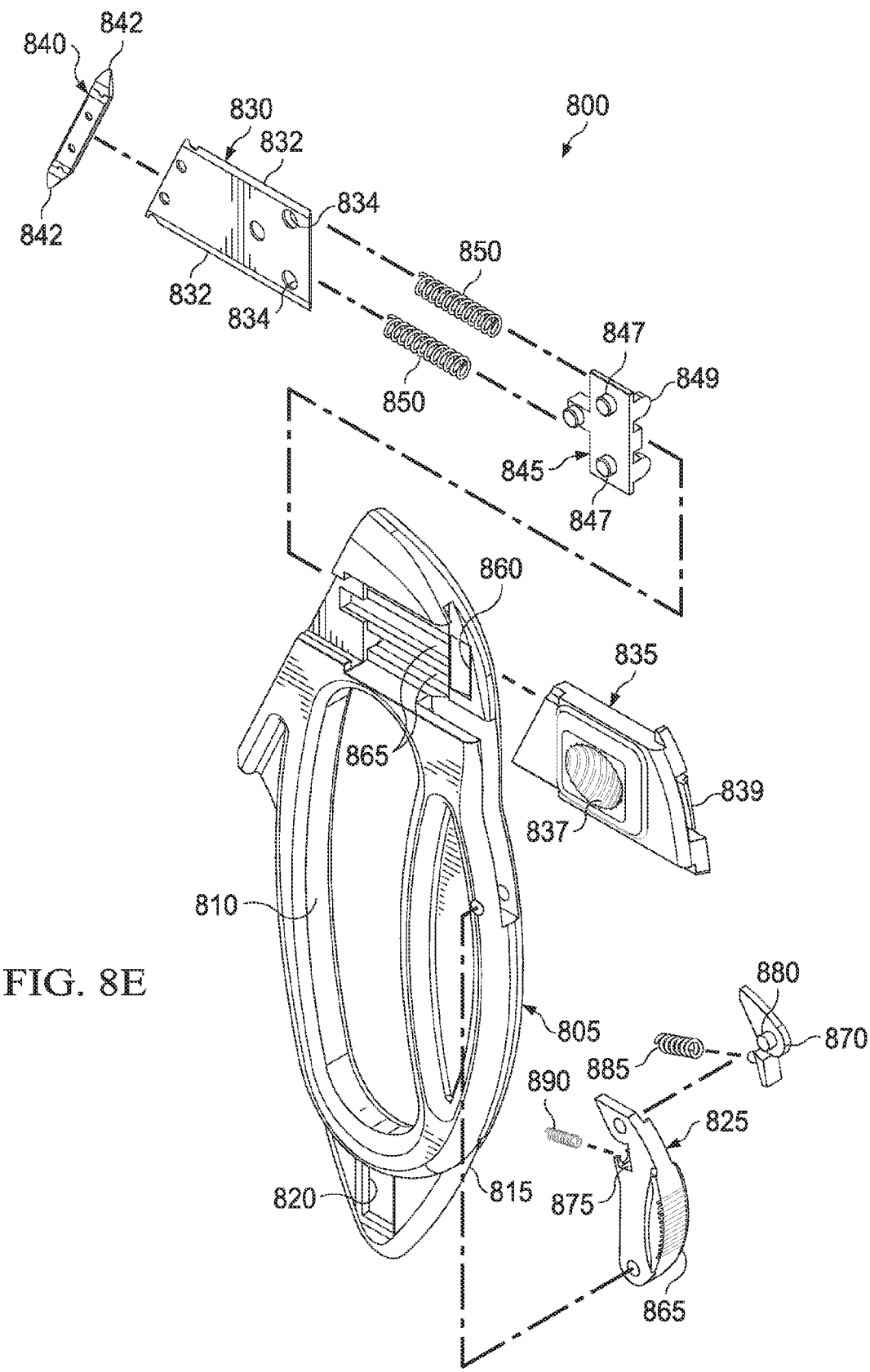

FIG. 8E illustrates an exploded view of the utility cutter 800. As more clearly shown in FIG. 8E, the biasing members 850 are positioned in the troughs 865 and constrained at one end by a wall of the troughs 865 and at an opposite end by stops 849 of the blade slide 845.

In operation, a user may actuate the trigger assembly 825 by depressing the trigger 865 to move the pawl 870 into contact with the blade shuttle 845. The trigger 865 pivots about the pin 880 that connects the trigger 865 to the handle 805. As the pawl 870 is urged into contact with the blade shuttle 845, the biasing members 850 are overcome and the blade shuttle 845 is urged into the extended or cutting position (FIG. 8C). In some aspects, the force of the biasing members 850 maintain or help maintain contact of the blade shuttle 845 and the pawl 870 during actuation of the trigger assembly 825.

During actuation of the trigger assembly 825, the biasing member 885 may apply a force against the pawl 870 to counter a force (or torque) applied to the pawl 870 by the biasing members 850 through the blade shuttle 845. For example, as the pawl 870 is designed to pivot about the pin 880 that couples the pawl 870 to the trigger 865, force (or torque) applied to the pawl 870 from the biasing members 850 acts in a clockwise direction while force (or torque) applied to the pawl 870 by the biasing member 885 acts in a counterclockwise direction.

In some aspects, when the utility cutter 800 is in a neutral or retracted position, the biasing member 885 (e.g., a compression spring or other biasing component) may be at a neutral position and exert minimal or no force against the pawl 870. Further, in some aspects, the biasing member 890 may apply a substantially continuous force (e.g., a spring force) or torque on the pawl 870 to urge the pawl 870 into the position shown in FIG. 8B (e.g., in a clockwise movement).

In the cutting or extended position, the blade 830 is extended to engage the material 200. Once engaged, the blade 830 may be further extended by a cutting or slicing force that is exerted by frictional contact between the blade 830 and the material 200. The frictional contact as the blade 830 cuts or slices the material 200 overcomes the force applied to the blade shuttle 845 (and indirectly the blade 830) by the biasing members 850 and urges the blade 830 a distance further from the handle 805 than a distance that the blade 830 extends in the cutting position (e.g., as shown in FIG. 8C). For example, FIG. 8D shows the utility cutter 800 as the blade 830 is engaged with the material 200 and is urged the further distance from the handle 805. In this engaged position, the blade shuttle 845 is urged out of contact with the pawl 870. The blade shuttle 845 is further urged out of contact with the pawl 870, due to, for example, the greater force (or torque) applied to the pawl 870 by the biasing member 885 as compared to the force (or torque) applied to the pawl 870 by the biasing member 890.

When the pawl 870 is in the position shown in FIG. 8D, the blade shuttle 845 may be urged (e.g., by the biasing members 850) into the retracted position without conflict with the pawl 870 once the blade 830 becomes disengaged with the material 200. The blade shuttle 845 may be urged into the retracted position, thereby urging the blade 830 into the handle 805 even if the user continues to actuate (e.g., apply a force to) the trigger 865. Thus, utility cutter 800 may provide for automatic retraction of the blade 830 with the trigger assembly 825 actuated or unactuated.

In some aspects, the utility cutter 800 may include one or more of the following features. For example, the blade 830 may extend slightly from the handle 805 even when the cutter 800 is in the retracted position, thereby providing for a "thin cut" of various materials, such as thin cardboard, cellophane tape, or other material without extension of the blade 830 as described above. Further, although the blade 830 is shown as having two cutting edges 832, other types of blades may be used in the utility cutter 800, such as a single edge, hook edge, scraper edge, scalpel, triangular blade, rotating disk blade, or otherwise. Further, the blade 830 may have two different shaped edges 832. In some aspects, for example, due to the autoretract feature, the utility cutter 800 may not include the guide 840.

FIGS. 9A-9D illustrate various views of another example implementation of a utility cutter 900 that includes a trigger 925 in various positions. The utility cutter 900 includes the trigger 925 that may be actuated (e.g., by a user) to adjust a blade 930 from, for example, a retracted position to an extended position to cut or slice a material. As illustrated, the utility cutter 900 includes a handle (or housing) 905 that provides a gripping surface for a user of the utility cutter 900. In some aspects, the handle 905 may be manufactured to promote cleaning and sterilization of the utility cutter 900, such as, for example, through the use of non-corrosive materials (e.g., stainless steel, aluminum, plastic, or other non-corrosive and/or inert material) and/or with open contours substantially free from undercuts (e.g., to eliminate or partially eliminate material being trapped in or on the utility cutter 900). For example, in some aspects, the handle 905 (e.g., a solid, unibody structure) may be machine washable (e.g., through a dishwasher).

In the illustrated embodiment, the handle 905 includes a hand grip 910 that includes a substantially oval aperture through the handle 905. The hand grip 910 may be sized to accommodate several fingers of an adult hand of a user so that the user may securely grip the utility cutter 900 during cutting or slicing of a material. The illustrated handle 910 may also include a "knuckle" cover (such as the knuckle cover 107 shown in FIG. 1) that protects a user's fingers from contact with, for example, a material that may include sharp edges, staples, or other injury-causing surfaces.

The illustrated handle 905 further includes an edge 915 that extends along at least a portion of a contoured surface of the handle 905. The edge 915, in some implementations, may be sharpened (e.g., a 0.010 inch dull edge) relative to the contoured surface. Although the edge 915 may still be dull enough so as to prevent cutting or slicing of the user, the edge 915 may be sharp enough to slice through other flexible materials, such as, for example, cellophane tape or other packing tape that does not lend itself to efficient cutting with a sharpened blade (e.g., the blade 930).

Figure 9A:
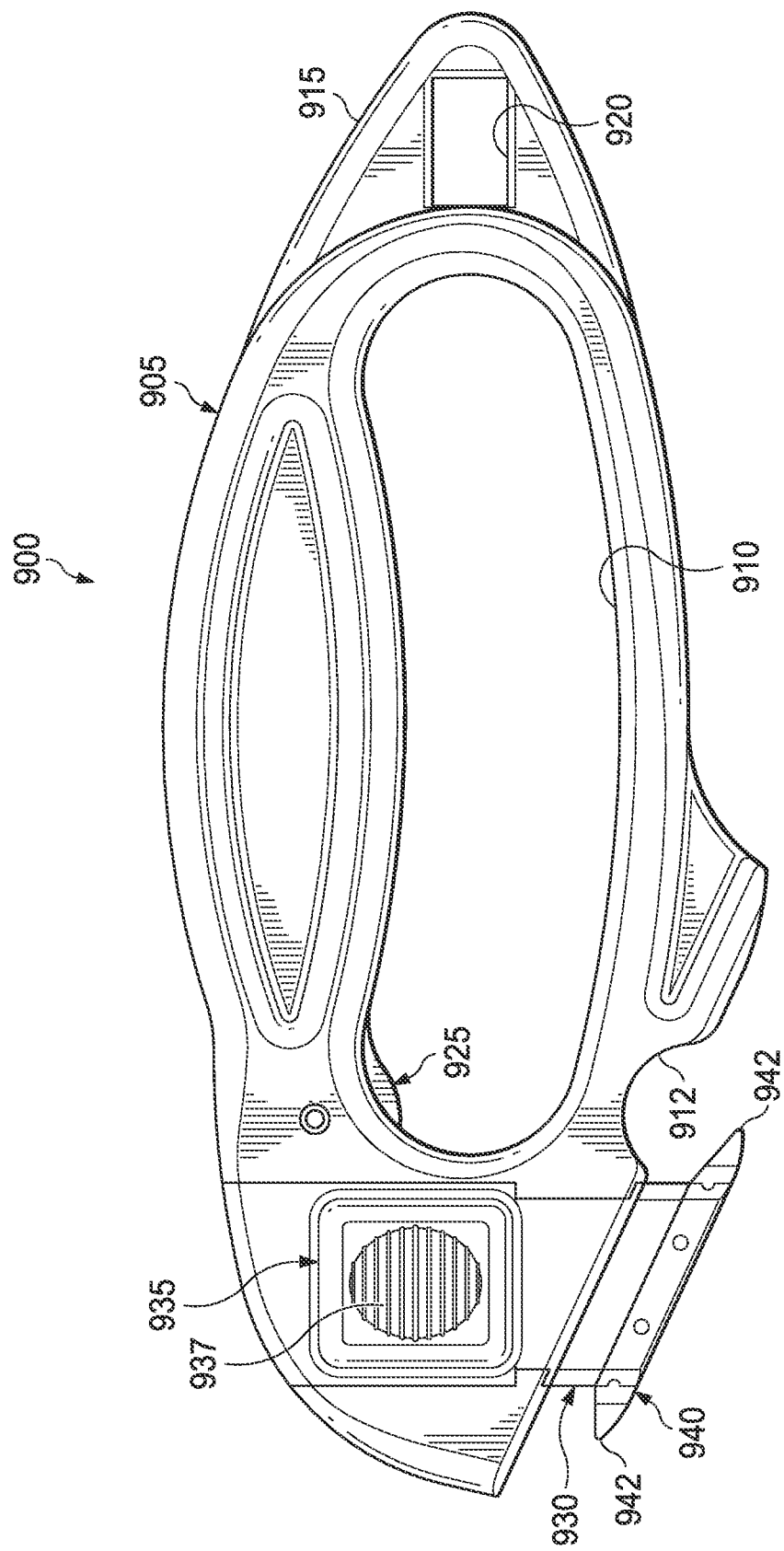
FIGS. 9A-9D illustrate various views of another example implementation of a utility cutter that includes a trigger in various positions.

The illustrated handle 905 may further include a hook 920 that includes an aperture through the handle 905 at a particular location. In FIG. 9A, for example, the hook 920 is positioned at an end of the handle opposite the blade 930. In some aspects, the hook 920 may facilitate hanging the utility cutter 900 from, for example, a stationary structure such as a wall, as well as a user's belt or other clothing. The hook 920, therefore, may help the user find the utility cutter 900 and/or help prevent misplacement of the utility cutter 900.

Figure 9B:
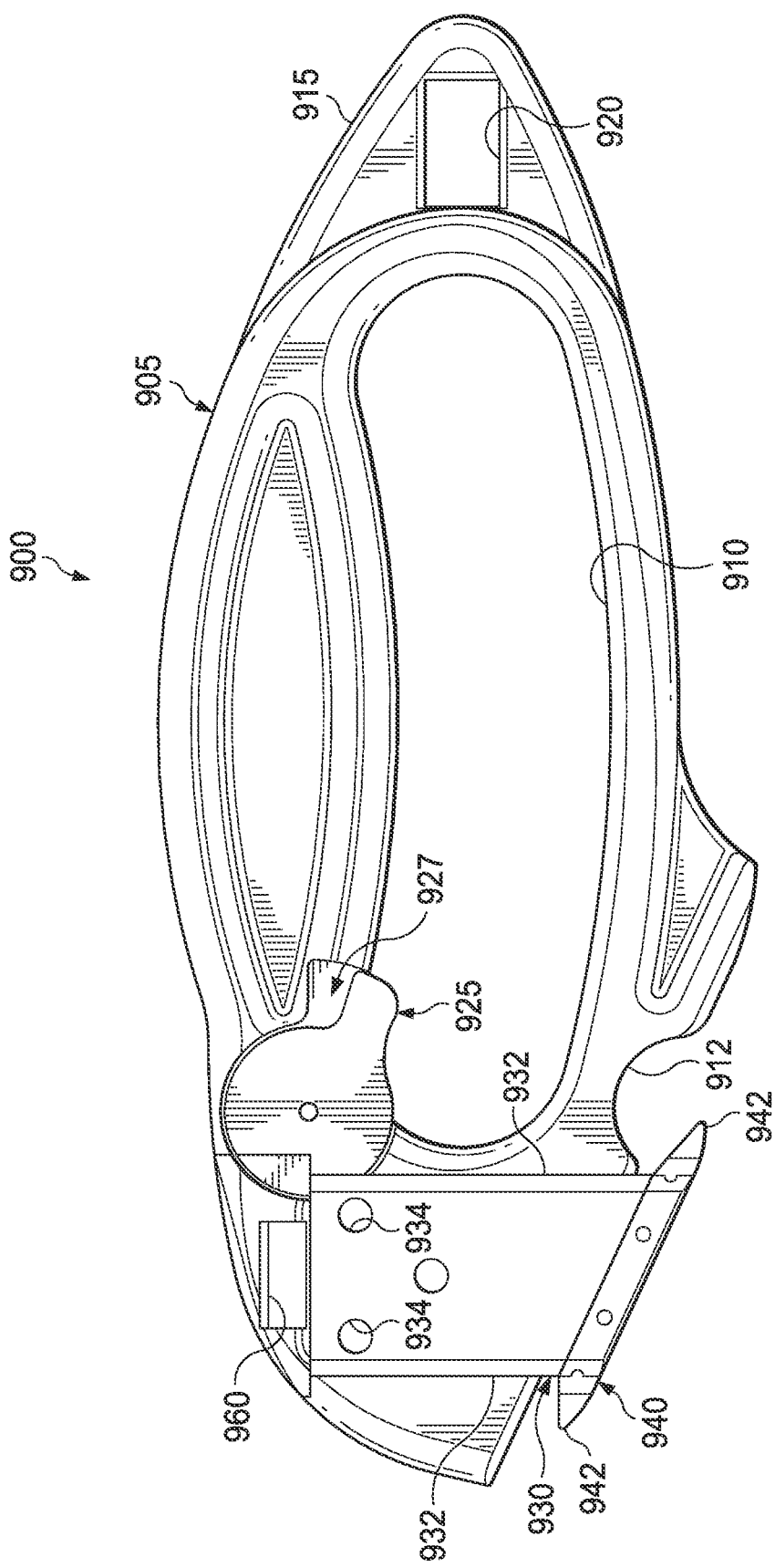

As illustrated in FIGS. 9A and 9B, for example, the utility cutter 900 is shown in a retracted position in which all or most of the blade 930 is withdrawn into the handle 905. Although a small portion of the blade 930 is shown in FIG. 9A as extending from the handle 905, in some aspects, in a retracted (or safe) position, the blade 930 may be enclosed within the handle 905 such that none of the blade 930 is visible outside of the handle 905 and a guide 940 that is integrally mounted on the blade 930 is substantially flush against the handle 905. Alternatively, in some aspects, in the retracted position, the blade 930 may extend a distance (e.g., 1/16 inch) from the handle 905, thereby creating a gap between the guide 940 and the handle 905. Based on the gap, for instance, the utility cutter 900 may be operable to cut or slice various materials (e.g., cellophane tape, straps, rope, cords, and otherwise) that fit within the gap.

In some implementations, the guide 940 is coupled to (e.g., permanently or semi-permanently) or integral with the blade 930. The guide 940 includes a ramp angle that terminates in points 942 (e.g., dull points of 0.005 inch) on either end of the guide 940. The points 942, in some aspects, may be configured to pierce a material so as to provide an initial cut through which the blade 930 my extend to begin further cutting or slicing. Further, the guide 940, and in some aspects the points 942 specifically, may provide for a catch that, when engaged with a material, forcibly extends the blade 930 from the handle 905 (as described below).

With reference to FIG. 9A specifically, the utility cutter 900 includes a body recess 912 in the handle 905 near the blade 930. In some aspects, the body recess 912 may provide for a greater angle of approach, and a deeper point of penetration, of one of the points 942 of the guide 940. For example, once the point 942 is engaged with the material and the utility cutter 900 is rotated to return the angle of cut to a normal position in which the material is aligned with the blade, the guide 940 may automatically extend the blade 930 from the handle 905 to perform a deeper cut in the material. Further, the body recess 912 may allow the utility cutter 900 to better compress the material between the guide 940 and the handle 905 to increase cutting ease and efficiency, as described above.

Figure 9C:
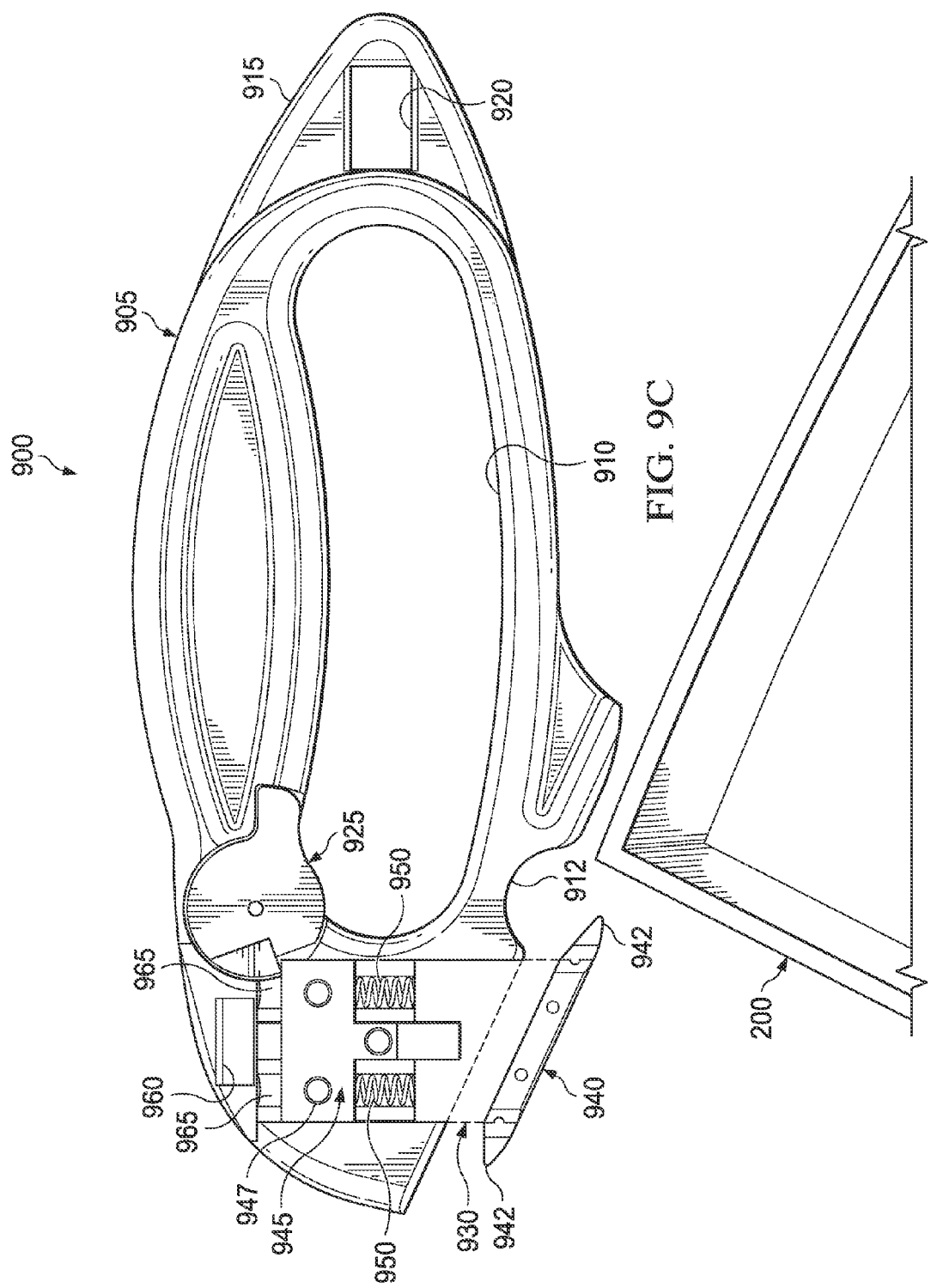

The illustrated implementation of the utility cutter 900 includes a cover 935 that is removably engaged with the handle 905. The cover 935, as illustrated, includes a ridged surface 937 to promote contact between the cover 935 and a user (e.g., a user's thumb). The ridged surface 937 may provide at least two purposes. First, the ridged surface 937 may provide a rest for a user's thumb during use (e.g., slicing or cutting) of the utility cutter 900. To that end, each side of the utility cutter 900 may include a ridged surface 937 in some implementations. The ridged surface 937 may also provide a friction point for a user to exert force to remove the cover 935 from the handle 905. For example, as shown in FIGS. 9B-9C, removal of the cover 935 from the handle 905 may expose components of the utility cutter 900 that are positioned in a cavity 955 in the handle 905. In some aspects, the blade 930 may be removed and replaced by removing the cover 935 from the handle 905.

The cover 935 may be coupled to the handle 905 with a latch 939 that engages with a notch 960 in the handle 905. In some aspects, the latch 939 is an integrated latch that will automatically engage when the cover 935 is closed, and can be disengaged by applying pressure against the latch 939 to decouple the latch 939 from the notch 960. Once disengaged, the cover 935 may be pulled away from the handle 905 (e.g., pivoting the cover 935 away from the notch 960).

Turning to FIGS. 9B-9C, sectional views of the utility cutter 900 are illustrated, in which the trigger 925 and a trigger cover 927 are exposed for illustrative purposes. The trigger 925 includes, as illustrated, a trigger cover 927 that is coupled to the trigger 925 in the handle 905.

FIG. 9B illustrates the utility cutter 900 in a retracted or safe position in which the blade 930 is unextended from the handle 905 and the trigger 925 does not exert any force on a blade shuttle 945 (shown in FIG. 9C) that is coupled to the blade 930 through posts 947 that are inserted into holes 934. The trigger 925 is shown in a rest position. The blade 930 is urged into the retracted position by biasing members 950 that are in contact with the blade shuttle 945 and urge the blade shuttle 945 (and thus blade 930) towards the trigger 925. As illustrated, in the refracted position, a trigger stop 970 is against the blade shuttle 945 at a bottom edge of the shuttle 945 while a trigger edge 975 of the trigger is against the blade shuttle 945 at a back edge of the shuttle 945.

FIG. 9C illustrates the utility cutter 900 in an extended or forward position in which a user has actuated the trigger 925 to contact the blade shuttle 945 to extend the blade 930 from the handle 905. In such a position, for instance, the point 942 of the guide 940 may be in a position to engage a material 200 in order to begin a cut or slice. As illustrated, the trigger 925 is pivoted by the user (e.g., through finger engagement) at the pin 980 to urge the blade shuttle 945 forward, thereby compressing the biasing members 9550 (e.g., compression spring) with the blade shuttle 945 (e.g., walls 949 of the blade shuttle 945).

Figure 9D:
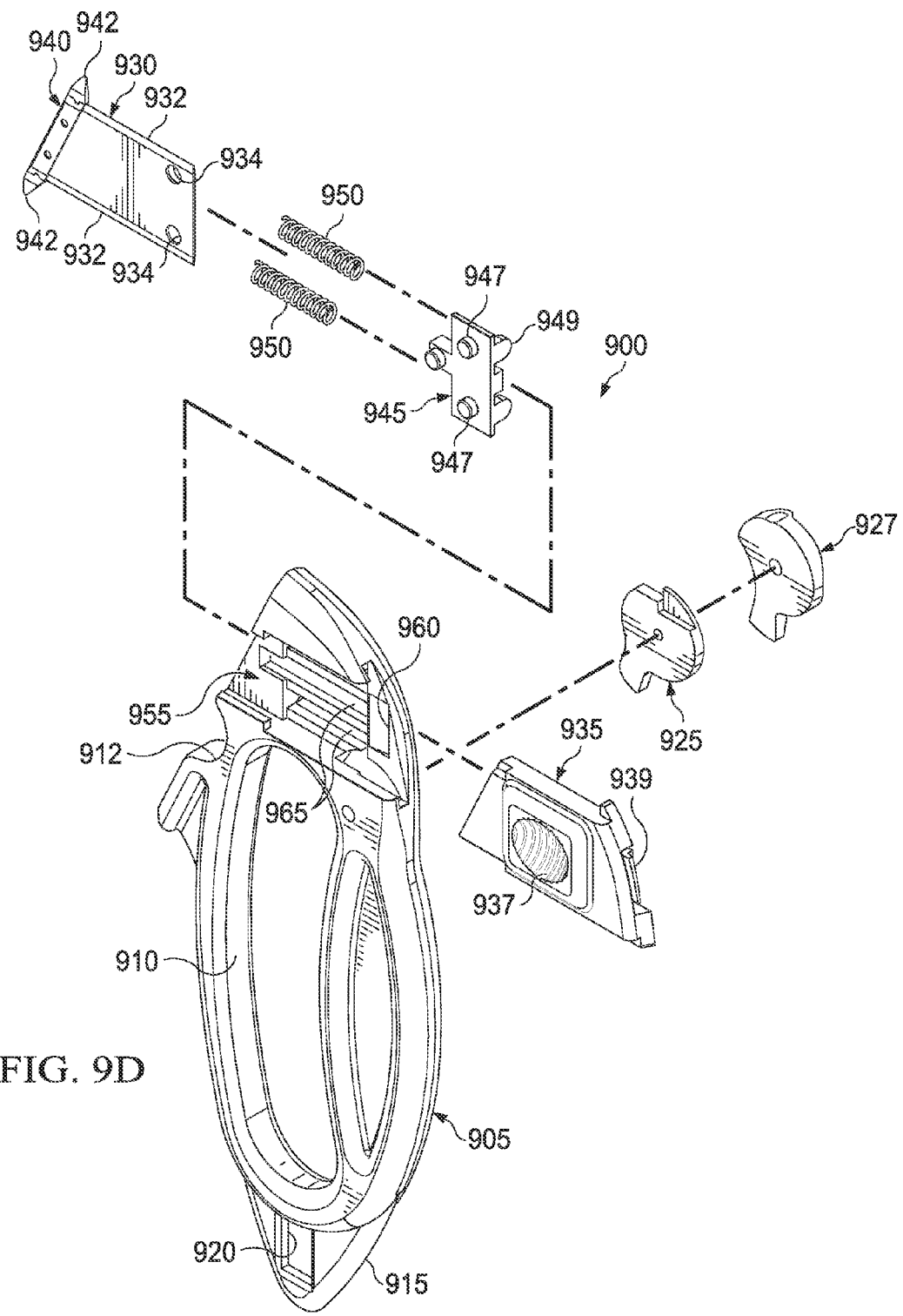

FIG. 9D illustrates an exploded view of the utility cutter 900. As more clearly shown in FIG. 9D, the biasing members 950 are positioned in the troughs 965 and constrained at one end by a wall of the troughs 965 and at an opposite end by stops 949 of the blade slide 945.

In operation, a user may actuate the trigger 925 to rotate the trigger 925 into contact (e.g., at the trigger edge 975) with the blade shuttle 945. The trigger 925 rotates about the pin 980 that connects the trigger 965 to the handle 905 and the trigger cover 927. As the trigger edge 975 is urged into contact with the blade shuttle 945, a force exerted on the blade shuttle 945 by the biasing members 950 is overcome and the blade shuttle 945 is urged into the extended or cutting position (FIG. 9C). In some aspects, the force of the biasing members 950 maintain or help maintain contact of the blade shuttle 945 and the trigger 925 during actuation of the trigger 925.

In the cutting or extended position, the blade 930 is extended to engage the material 200. Once engaged, the blade 930 may be further extended by a cutting or slicing force that is exerted by frictional contact between the blade 930 and the material 200. The frictional contact as the blade 930 cuts or slices the material 200 overcomes the force applied to the blade shuttle 945 (and indirectly the blade 930) by the biasing members 950 and urges the blade 930 a distance further from the handle 905 than a distance that the blade 930 extends in the cutting position. In this engaged position, the blade shuttle 945 is urged out of contact with the trigger 925 (e.g., at the trigger edge 975). Once the blade 930 is disengaged from the material 200, the biasing members 950 may urge the blade shuttle 945 back against the trigger edge 975. If the trigger 925 is actuated by the user (e.g., as shown in FIG. 9C), then the blade shuttle 945 contacts the trigger edge 975 and, in some examples, may stop at the trigger edge 975. If the user has deactuated the trigger 925, the blade shuttle 945 may return the retracted position once the blade 930 has disengaged from the material 200.

Figure 10:
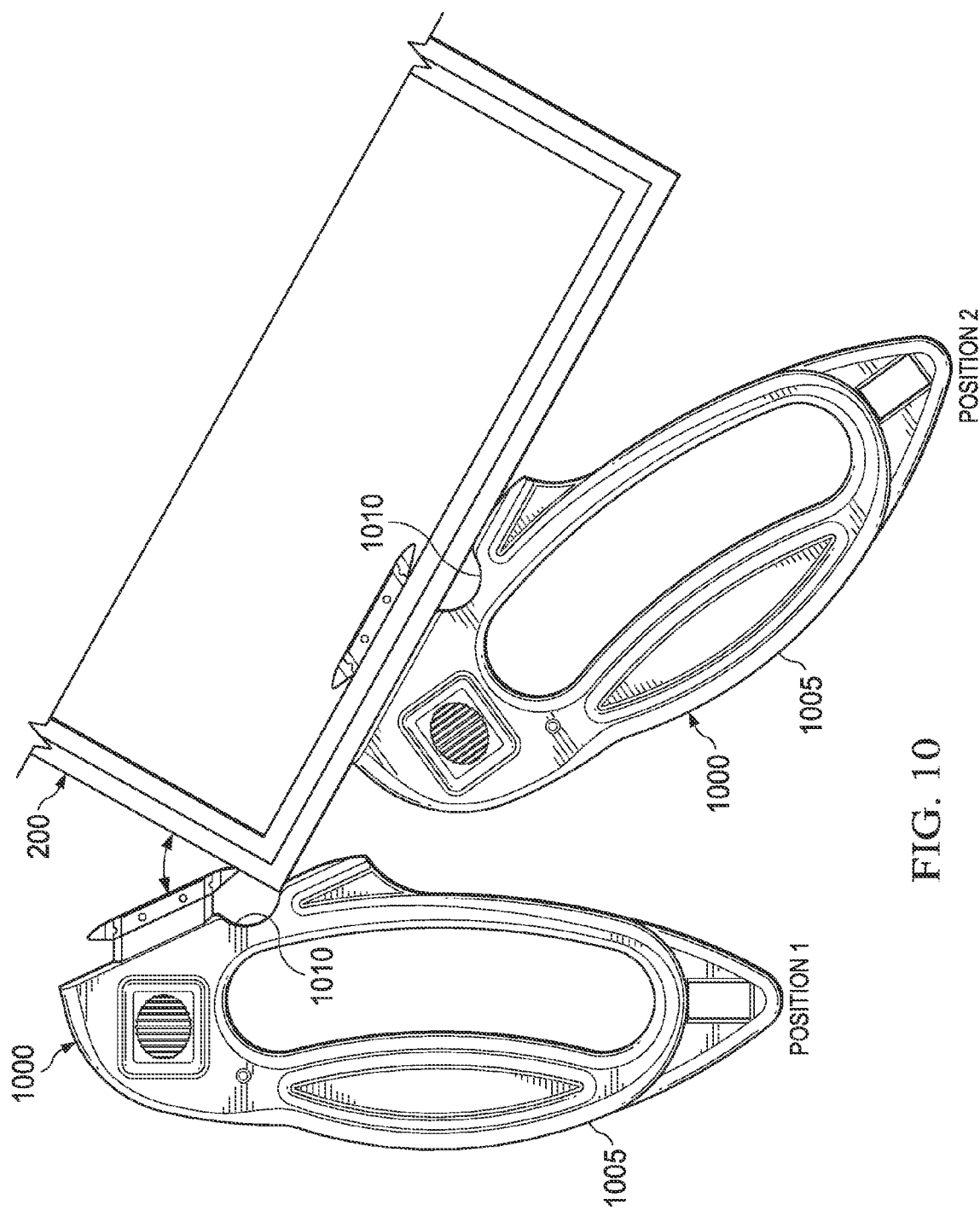
FIG. 10 illustrates an operation of an example implementation of a utility cutter that includes a scalloped handle.

FIG. 10 illustrates an operation of an example implementation of a utility cutter 1000 that includes a scalloped handle 1005. FIG. 10 illustrates the utility cutter 1000 in a Position 1 as a guide of the cutter 1000 engages the material 200 and a Position 2 as the cutter 1000 slices or cuts through the material 200 (viewed from above in this figure). The utility cutter 1000, in some implementations, may be similar, identical, or substantially identical to the utility cutter 100, the utility cutter 800, and/or the utility cutter 900 as described above.

As illustrated, a handle 1005 of the utility cutter 1000 includes a scallop 1010 adjacent a bottom edge of a cutting blade of the cutter 1000. In the illustrated embodiment, the scallop 1010 includes a cut-out area of the handle 1005 that allows for a space into which, for instance, a corner of the material 200 may be inserted so as to increase an angle of cut 9 as shown) between a cutting edge of the blade of the cutter 1000 and the material 200. For example, as shown in Position 1, the utility cutter 1000 is positioned so that the guide of the cutter 1000 is engaged with the material 200. As illustrated in Position 1, a leading edge of the scallop 1010 is in contact with a corner of the material 200, thereby providing a compressive force on the material 200 between the leading edge and the guide of the cutter 1000.

In Position 2, the utility cutter 1000 is shown cutting or slicing the material 200. As described above, in some aspects, the guide and the handle 1005 of the cutter 1000 may compress the material 200 therebetween, thus allowing for an easier and more efficient cut of the material by the cutter 1000.

Figure 11:
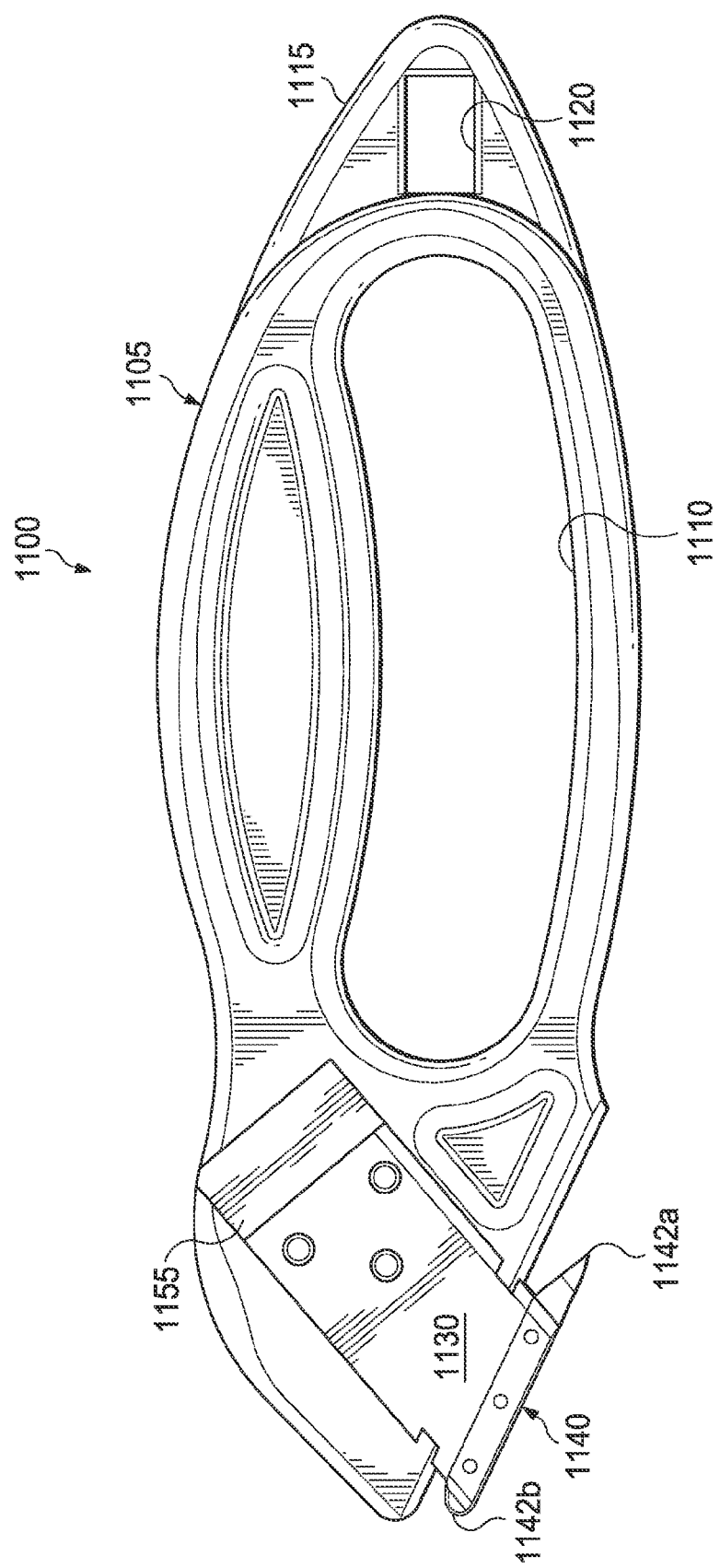
FIG. 11 illustrates a side view of another example implementation of a utility cutter.

FIG. 11 illustrates a side view of another example implementation of a utility cutter 1100. Generally, the utility cutter 1100 has similar features as other example implementations of utility cutters described herein (e.g., housing 1105, a hand grip 1110, an edge 1115, a hook 1120, and a guide 1140 with points 1142a and 1142b). Utility cutter 1100, however, includes an angled cavity 1155 (e.g., relative to a housing 1105) through which a blade 1130 (and blade shuttle, not shown, that is coupled to the blade 1130) may move between refracted and cutting positions.

The angled cavity 1155 may allow the blade 1130 to move into the cutting position at an angle relative to the housing 1105. In some aspects, the blade angle relative to a material to be cut or sliced may be important to increase efficiency and ease of cutting. For instance, as the blade 1130 makes contact against a material, the first contact of the blade 1130 is at a leading edge of the blade 1130, where a greater force is created against the material. As the blade 1130 cuts the material, a force on the blade 1130 decreases (e.g., as the blade 1130 follows into a cut made by the blade with the leading edge separating the material as it cuts).

In some aspects, another angle of the blade 1130 relative to the housing may be about 25 degrees, thereby allowing the blade 1130 to meet less resistance. To that end, the point 1142a may include a slightly sharper edge as compared to the point 1142b, in order to assist the user in engaging the material to use the leading edge of the blade 1130. Further, the point 1142a may form an angle (e.g., about 25 degrees) relative to an edge of the housing 1105. In some aspects, such an angle on the blade 1130 extends the blade using a greater force at the base of the blade 1130 as it penetrates the material being cut. In some aspects, as the blade 1130 cuts the material, such a force on the blade 1130 increases on the cutting edge as penetration of the material increases, thereby resulting in a natural force to extend the blade 1130 from the housing 1105.

A number of implementations have been described. Nevertheless, it will be understood that various modifications may be made. Accordingly, other implementations are within the scope of the following claims.

What is claimed is:

1. A method for slicing a material, comprising:
   engaging a material with a guide coupled to a blade of a utility knife near a proximal end of the blade, the blade coupled to a blade shuttle near a distal end of the blade, the blade shuttle positioned within a housing of the utility knife;
   extending, through engagement of the material with the guide, the blade a distance away from the housing from a safe position substantially enclosed within the housing to a cutting position substantially out of the housing, the blade shuttle biased to move the blade from the cutting position to the safe position;
   engaging the material with the blade to slice the material; and
   based on a user of the utility knife disengaging the guide or the blade from the material, urging the blade shuttle to move the blade from the cutting position towards the safe position by a biasing member coupled between the blade shuttle and housing.

2. The method of claim 1, wherein engaging a material with a guide comprises engaging the material with a pointed edge of the guide to penetrate the material.

3. The method of claim 1, further comprising exerting a compressive force on the material compressed between the guide and a face surface of the housing by biasing the blade shuttle to move the blade and the guide towards the face surface of the housing.

4. The method of claim 1, further comprising:
   disengaging the blade from the material.

5. The method of claim 4, wherein urging the blade shuttle to move the blade from the cutting position towards the safe position by a biasing member coupled between the blade shuttle and housing comprises urging the blade shuttle by the biasing member without user action.

6. The method of claim 1, further comprising actuating a trigger to move the blade shuttle such that the blade is extended from the housing from the safe position to the cutting position to engage the material.

7. A knife, comprising:
a handle that comprises a gripping surface;
a blade slide positioned in a recess of the handle;
a blade coupled to the blade slide near a proximal end of the blade and positioned in the recess when the blade slide is in a retracted position;
a guide coupled to the blade near a distal end of the blade opposite the proximal end, the guide comprising a contoured surface configured to engage a workpiece to extend the blade slide a distance from the retracted position to an extended position such that the blade is extended from the recess of the handle, the blade slide biased to move from the extended position to the retracted position; and
a biasing member in contact with the blade slide, the biasing member configured to exert a substantially constant force on the blade slide to bias the slide into the retracted position.

8. The knife of claim 7, wherein the guide comprises at least one pointed edge along the contoured surface, the pointed edge configured to engage the workpiece.

9. The knife of claim 7, wherein the biasing member comprises a first biasing member, the knife further comprising a second biasing member in contact with the blade slide, the second biasing member configured to exert a substantially constant force on the blade slide to bias the slide into the retracted position.

10. The knife of claim 9, wherein at least one of the first or second biasing members comprises a spring.

11. The knife of claim 9, wherein at least one of the first or second biasing members is at least partially enclosed within the recess, the knife further comprising a cover coupled to the handle to selectively expose the at least one biasing member and the blade slide to an exterior of the handle.

12. The knife of claim 7, wherein the blade comprises a cutting edge configured to engage the workpiece when the blade slide is in the extended position.

13. The knife of claim 12, wherein the cutting edge comprises a first cutting edge, the blade further comprising a second cutting edge opposite to the first cutting edge, the second cutting edge configured to engage the workpiece when the blade slide is in the extended position.

14. A utility knife, comprising:
a handle comprising a cavity that extends through the handle;
a blade shuttle positioned in the cavity and configured to be movable within the cavity;
a blade coupled to the blade shuttle near a proximal end of the blade, the blade configured to be withdrawn into the cavity when the blade shuttle is moved towards a retracted position;
a guide coupled to the blade near a distal end of the blade opposite the proximal end, the guide configured to engage a material such that the blade is extended from the cavity and the blade shuttle is moved a distance from the retracted position to an extended position, the blade shuttle biased from the extended position towards the retracted position; and
a biasing member coupled to the handle and to the blade shuttle to urge the blade shuttle into the retracted position in response to disengagement of the guide or blade with the material.

15. The utility knife of claim 14, wherein the guide comprises at least one pointed edge along a contoured surface of the guide, the pointed edge configured to engage the material.

16. The utility knife of claim 14, wherein the biasing member is positioned in a trough within the cavity and constrained at one end by a wall of the trough and at an opposite end by the blade shuttle, the biasing member exerting the force against the blade shuttle to bias the blade shuttle towards the retracted position.

17. The utility knife of claim 14, wherein the blade shuttle is extended, through the engagement of the material with at least one of the guide or the blade, from the retracted position to the extended position, and is retracted, through disengagement of the at least one of the guide or the blade from the material, from the extended position to the retracted position.

18. The utility knife of claim 14, wherein the blade comprises a cutting edge configured to engage the material when the blade shuttle is in the extended position.

19. The utility knife of claim 14, wherein the guide is separated from the handle by a gap sized to receive a portion of the material when the blade shuttle is in the retracted position.

20. The utility knife of claim 14, further comprising a trigger assembly configured to adjust the blade shuttle from the retracted position to the extended position such that the blade is extended from the opening to engage the material.

21. The utility knife of claim 20, wherein the trigger assembly comprises a trigger pivotally coupled to the handle through a first pin and pivotally coupled to a pawl through a second, different pin, the trigger configured to be actuated such that the pawl contacts the blade shuttle to urge the blade shuttle from the retracted position to the extended position.

22. The utility knife of claim 21, further comprising a biasing member in contact with the blade shuttle, wherein the trigger assembly comprises a second biasing member coupled to the pawl and configured to provide a first force against the pawl to counter a second force applied to the pawl by the biasing member through the blade shuttle when the trigger is actuated.

23. The utility knife of claim 21, wherein, based on engagement of the blade with the material, the blade and the blade shuttle are extended the distance towards the material such that the pawl is released from contact with the blade shuttle.

24. The utility knife of claim 14, further comprising a trigger pivotally coupled to the handle and configured to be actuated to rotate into contact with the blade shuttle to urge the blade shuttle from the retracted position to the extended position.

25. The utility knife of claim 14, wherein the handle comprises a scallop adjacent a bottom edge of the blade, the scallop comprising a cut-out area of the handle configured to provide a space for receiving a corner of the material.

26. The utility knife of claim 14, wherein the handle defines a vertical direction, and the cavity is angled relative to the vertical direction such that the blade is extended at an angle relative to the vertical direction when the blade shuttle is moved from the retracted position to the extended position.

* * * * *